United States Patent
Gruber et al.

(10) Patent No.: US 8,163,390 B2
(45) Date of Patent: Apr. 24, 2012

(54) RADIATION-CURABLE COMPOUNDS

(75) Inventors: Nick Gruber, Mannheim (DE); Reinhold Schwalm, Wachenheim (DE); Oscar Lafuente Cerda, Ebersberg (DE); Frank Voellinger, Knoeringen (DE); Gabriele Dlugosch, Worms (DE); Erich Beck, Ladenburg (DE); Klaus Menzel, Ludwigshafen (DE); Susanne Neumann, Speyer (DE)

(73) Assignee: BASF SE, Ludwigshafen (DE)

( * ) Notice: Subject to any disclaimer, the term of this patent is extended or adjusted under 35 U.S.C. 154(b) by 331 days.

(21) Appl. No.: 12/444,593

(22) PCT Filed: Oct. 8, 2007

(86) PCT No.: PCT/EP2007/060628
§ 371 (c)(1),
(2), (4) Date: Apr. 7, 2009

(87) PCT Pub. No.: WO2008/043722
PCT Pub. Date: Apr. 17, 2008

(65) Prior Publication Data
US 2010/0098950 A1    Apr. 22, 2010

(30) Foreign Application Priority Data

Oct. 9, 2006 (EP) .................................. 06121970
Oct. 26, 2006 (EP) .................................. 06123034

(51) Int. Cl.
*B32B 27/40* (2006.01)
*C08G 77/04* (2006.01)
*C08F 2/46* (2006.01)

(52) U.S. Cl. .......... 428/423.1; 428/438; 528/28; 522/90

(58) Field of Classification Search ............... 428/423.1, 428/438; 528/28; 522/90
See application file for complete search history.

(56) References Cited

U.S. PATENT DOCUMENTS

| | | | |
|---|---|---|---|
| 4,130,708 | A | 12/1978 | Friedlander et al. |
| 4,567,228 | A * | 1/1986 | Gaa et al. ........................ 524/588 |
| 4,810,749 | A * | 3/1989 | Pinchuk ......................... 524/730 |
| 5,312,943 | A | 5/1994 | Gaglani |
| 5,523,443 | A | 6/1996 | Gaglani |
| 5,939,491 | A | 8/1999 | Wilt et al. |
| 6,187,863 | B1 | 2/2001 | Wilt et al. |
| 6,617,413 | B1 | 9/2003 | Bruchmann et al. |
| 6,635,341 | B1 | 10/2003 | Barancyk et al. |
| 6,657,001 | B1 | 12/2003 | Anderson et al. |
| 2004/0195731 | A1 * | 10/2004 | Rische et al. .................. 264/488 |
| 2004/0219303 | A1 | 11/2004 | Wissing et al. |
| 2007/0112164 | A1 | 5/2007 | Roesler et al. |
| 2008/0041273 | A1 | 2/2008 | Baumgart et al. |

FOREIGN PATENT DOCUMENTS

| | | |
|---|---|---|
| DE | 10 2004 058 069 | 6/2006 |
| EP | 0 544 465 | 6/1993 |
| EP | 1 473 343 | 11/2004 |
| WO | 00 39183 | 7/2000 |
| WO | 2007 059071 | 5/2007 |
| WO | 2007 088126 | 8/2007 |

OTHER PUBLICATIONS

U.S. Appl. No. 12/744,395, filed May 24, 2010, Kutschera, et al.

* cited by examiner

*Primary Examiner* — Thao T. Tran
(74) *Attorney, Agent, or Firm* — Oblon, Spivak, McClelland, Maier & Neustadt, L.L.P.

(57) ABSTRACT

The invention relates to radiation-curable compounds, to processes for preparing them, to their use, and to coating compositions comprising them and featuring high scratch resistance.

20 Claims, No Drawings

RADIATION-CURABLE COMPOUNDS

The invention relates to radiation-curable compounds, to processes for preparing them, to their use, and to coating compositions comprising them and featuring high scratch resistance.

WO 00/39183 describes polyisocyanates which contain allophanate groups and carry free-radically polymerizable, activated C=C double bonds.

A disadvantage of these polyisocyanates is that for curing in coating materials they require a binder which must comprise isocyanate-reactive groups. Such further components must be metered in a precise stochiometry, and in the event of incorrect metering this is a possible source of insufficient cure.

EP-A1 544 465 describes radiation-curable alkoxysilylated acrylates. Acrylate groups therein are connected via spacers to alkoxysilyl groups. A disadvantage is the low degree of structural variability of such compounds.

U.S. Pat. No. 5,939,491 and U.S. Pat. No. 6,187,863 describe thermally curable coating compositions containing specific siloxanes.

These lack a mechanism for radiation curing.

U.S. Pat. No. 6,635,341 and U.S. Pat. No. 6,657,001 describe the same polysiloxanes in radiation-curable and dual-cure-curable coating compositions. For that purpose, monoesters of polyols are silylated with 1,2-dianhydrides, which may comprise polyisocyanates as optional synthesis components. No explicit examples are disclosed. U.S. Pat. No. 6,657,001, furthermore, describes two-component systems composed of polyacrylate polyol, melamine-formaldehyde resin, and isocyanate, and also polysiloxanes. A disadvantage of such coating compositions is that they are two-component systems, which are easy to meter incorrectly. Moreover, the polyisocyanates used have a relatively high viscosity.

U.S. Pat. No. 5,312,943 and U.S. Pat. No. 5,523,443 describe one-component alkoxysilyl acrylates. For this purpose first of all a urea derivative is formed from isocyanate and from a secondary amine carrying at least one trialkoxy group. The solubility of such urea derivatives is generally poor. Another synthesis option is based on silyl-carrying isocyanates. Such isocyanates, however, are not available commercially in industrial quantities. U.S. Pat. No. 5,523,443 discloses additionally the reaction with specific alcohols which comprise both a carbamate group and an alkoxysilyl group. Again, this is a very specific reaction component.

WO 2006/058680 discloses organosilyl-carrying urethane acrylates. For their synthesis, polyisocyanates containing allophanate groups are listed only as part of extended lists. Polyisocyanates containing allophanate groups are listed as being preferred only as a binder which carries no organic silyl groups.

It was an object of the present invention to provide readily soluble radiation-curable compounds which are curable by radiation and at least one other curing mechanism. The compositions in question ought to be one-component coating compositions, in order to rule out the instances of erroneous metering that are possible with two-component systems if the optimum stoichiometry is not observed, and ought to produce coatings with high hardness and scratch resistance, and additionally ought to be preparable from simple synthesis components.

This object has been achieved by means of polyurethanes containing allophanate groups and comprising as synthesis components
(a) at least one organic aliphatic, aromatic or cycloaliphatic di- or polyisocyanate,
(b) at least one compound (b) having at least one isocyanate-reactive group and at least one free-radically polymerizable unsaturated group,
(c) if appropriate, at least one compound having precisely two isocyanate-reactive groups,
(d) if appropriate, at least one compound having at least three isocyanate-reactive groups,
(e) if appropriate, at least one compound having precisely one isocyanate-reactive group,
(f) at least one compound having at least one organosilicon group and at least one isocyanate-reactive group, and
(g) if appropriate, at least one compound having at least one isocyanate-reactive group and at least one dispersive group.

In accordance with the invention the polyurethanes comprise allophanate groups; the amount of allophanate groups in such polyurethanes of the invention (calculated as $C_2N_2HO_3$=101 g/mol) is preferably from 1% to 28% by weight, more preferably from 3% to 25% by weight.

In one preferred embodiment of the present invention at least 20 mol %, preferably at least 25 mol %, more preferably at least 30 mol %, very preferably at least 35 mol %, in particular at least 40 mol %, and especially at least 50 mol % of the compound (b) having at least one isocyanate-reactive group and at least one free-radically polymerizable unsaturated group are incorporated via allophanate groups into the polyurethane of the invention.

The reaction mixtures obtained when preparing the polyurethanes of the invention generally have a number-average molar weight, $M_n$, of less than 10 000 g/mol, preferably of less than 5000 g/mol, more preferably of less than 4000, and with very particular preference of less than 2000 g/mol (determined by gel permeation chromatography using tetrahydrofuran and polystyrene as standard).

In order to reduce the amount of oxadiazinetrione groups it is necessary, as described for example in DE-A1 102 46 512, to carry out costly and inconvenient aftertreatment of polyisocyanates, such as, for example, heating for several hours under reduced pressure, supported if appropriate by stripping with a gas stream. In accordance with the invention, therefore, it is preferred to minimize the amount of oxadiazinetrione groups from the outset, by using low-oxadiazinetrione or oxadiazinetrione-free isocyanates where the amount of oxadiazinetrione groups in the isocyanates employed (calculated as $C_3N_2O_4$=128 g/mol) is for example less than 15%, preferably less than 10%, more preferably less than 8%, very preferably less than 5%, in particular less than 2.5%, and especially less than 1% by weight.

In one preferred embodiment, the polyurethanes of the invention have a very low oxadiazinetrione group content, less for example than 0.7% by weight (calculated as $C_3N_2O_4$=128 g/mol), preferably less than 0.6%, more preferably less than 0.5%, with particular preference less than 0.3%, with very particular preference less than 0.2%, in particular less than 0.1%, and especially less than 0.05% by weight. This is especially useful when the completed coating composition comprises not only the polyurethane of the invention but also binders containing isocyanate-reactive groups, since reaction of isocyanate-reactive groups with oxadiazinetriones may lead to the latter producing $CO_2$, which forms bubbles in the coating composition and hence may lead to film defects.

In a further preferred embodiment it is sufficient for the polyurethanes of the invention to have an oxadiazinetrione group content of between 0.2% and 0.6% by weight, preferably between 0.3% and 0.5%, more preferably between 0.35% and 0.45% (calculated as $C_3N_2O_4=128$ g/mol). This is especially useful when apart from the polyurethanes of the invention there are no other binders with isocyanate-reactive groups present in the completed coating composition. In that case there is generally no possibility of the above-described reaction that might lead to release of $CO_2$, and so this kind of level of oxadiazinetrione groups is generally tolerable.

The fraction of other groups which form from isocyanate groups, especially of isocyanurate, biuret, uretdione, iminooxadiazinetrione and/or carbodiimide groups, is of minor significance in accordance with the invention.

In one preferred embodiment of the invention the polyurethanes of the invention no longer have virtually any free isocyanate groups—in other words, the amount of free isocyanate groups is less than 0.5% by weight, preferably less than 0.3%, more preferably less than 0.2%, very preferably less than 0.1%, in particular less than 0.05%, and especially 0% by weight.

The component (a) may constitute monomers or oligomers of aromatic, aliphatic or cycloaliphatic diisocyanates, preferably of aliphatic or cycloaliphatic diisocyanates.

The NCO functionality of such a compound is generally at least 1.8 and can be up to 8, preferably 1.8 to 5, and more preferably 2 to 4.

The amount of isocyanate groups, calculated as NCO=42 g/mol, is generally 5% to 25% by weight.

The diisocyanates are preferably isocyanates having 4 to 20 carbon atoms. Examples of typical diisocyanates are aliphatic diisocyanates such as tetramethylene diisocyanate, pentamethylene 1,5-diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4-, or 2,6-diisocyanato-1-methylcyclohexane, and also 3 (or 4), 8 (or 9)-bis(isocyanatomethyl)tricyclo[$5.2.1.0^{2,6}$]decane isomer mixtures, and also aromatic diisocyanates such as tolylene 2,4- or 2,6-diisocyanate and the isomer mixtures thereof, m- or p-xylylene diisocyanate, 2,4'- or 4,4'-diisocyanatodiphenylmethane and the isomer mixtures thereof, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethylbiphenyl, 3-methyl-diphenylmethane 4,4'-diisocyanate, tetramethylxylylene diisocyanate, 1,4-diisocyanatobenzene or diphenyl ether 4,4'-diisocyanate.

Mixtures of said diisocyanates may also be present.

Particular preference is given to hexamethylene diisocyanate, 1,3-bis(isocyanatomethyl)cyclohexane, isophorone diisocyanate, and 4,4'- or 2,4'-di(isocyanatocyclohexyl)methane, very particular preference to isophorone diisocyanate and hexamethylene diisocyanate, and especial preference to hexamethylene diisocyanate.

Isophorone diisocyanate is usually in the form of a mixture, specifically a mixture of the cis and trans isomers, generally in a proportion of about 60:40 to 80:20 (w/w), preferably in a proportion of about 70:30 to 75:25, and more preferably in a proportion of approximately 75:25.

Dicyclohexylmethane 4,4'-diisocyanate may likewise be in the form of a mixture of the different cis and trans isomers.

Aromatic isocyanates are those which comprise at least one aromatic ring system.

Cycloaliphatic isocyanates are those which comprise at least one cycloaliphatic ring system.

Aliphatic isocyanates are those which comprise exclusively linear or branched chains, in other words acyclic compounds.

Also suitable are higher isocyanates, having on average more than 2 isocyanate groups. Examples include triisocyanates such as triisocyanatononane, 2,4,6-triisocyanatotoluene, triphenylmethane triisocyanate or 2,4,4'-triisocyanatodiphenyl ether, or the mixtures of diisocyanates, triisocyanates, and higher polyisocyanates for example that are obtained by phosgenating corresponding aniline/formaldehyde condensates and represent polyphenyl polyisocyanates containing methylene bridges.

Suitable polyisocyanates include polyisocyanates containing isocyanurate groups, polyisocyanates containing uretdione groups, polyisocyanates containing biuret groups, polyisocyanates containing urethane groups or allophanate groups, polyisocyanates comprising oxadiazinetrione groups or iminooxadiazinedione groups, uretonimine-modified polyisocyanates, polyurethane-polyisocyanate prepolymers or polyureapolyisocyanate prepolymers synthesized from linear or branched $C_4-C_{20}$ alkylene diisocyanates, cycloaliphatic diisocyanates having a total of 6 to 20 carbon atoms or aromatic diisocyanates having a total of 8 to 20 carbon atoms, or mixtures thereof.

The di- and polyisocyanates which can be used preferably have an isocyanate group (calculated as NCO, molecular weight=42) content of 10% to 60% by weight, based on the di- and polyisocyanate (mixture), preferably 15% to 60% by weight, and more preferably 20% to 55% by weight.

Preference is given to aliphatic and/or cycloaliphatic di- and polyisocyanates, qualified collectively as (cyclo)aliphatic for the purposes of this specification, examples being the aliphatic and/or cycloaliphatic diisocyanates stated above, or mixtures thereof.

For the present invention it is possible to use not only those di- and polyisocyanates obtained by phosgenating the corresponding amines but also those prepared without the use of phosgene, i.e., by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087, 739), for example, (cyclo)aliphatic diisocyanates, such as hexamethylene 1,6-diisocyanate (HDI), isomeric aliphatic diisocyanates having 6 carbon atoms in the alkylene radical, 4,4'- or 2,4'-di(isocyanatocyclohexyl)methane, and 1-isocyanato-3-isocyanatomethyl-3,5,5-trimethylcyclohexane (isophorone diisocyanate or IPDI), for example, can be prepared by reacting the (cyclo)aliphatic diamines with, for example, urea and alcohols to give (cyclo)aliphatic biscarbamic esters and subjecting said esters to thermal cleavage into the corresponding diisocyanates and alcohols. The synthesis takes place usually continuously in a circulation process and in the presence, if appropriate, of N-unsubstituted carbamic esters, dialkyl carbonates, and other by-products recycled from the reaction process. Di- or polyisocyanates obtained in this way generally contain a very low or even unmeasurable fraction of chlorinated compounds, leading to favorable color numbers in the products.

In one embodiment of the present invention the di- and polyisocyanates (a) have a total hydrolyzable chlorine content of less than 200 ppm, preferably of less than 120 ppm, more preferably less than 80 ppm, very preferably less than 50 ppm, in particular less than 15 ppm, and especially less than 10 ppm. This can be measured by means, for example, of ASTM specification D4663-98. Of course, though, di- and polyisocyanates (a) having a higher chlorine content can also be used.

The di- and polyisocyanates (a) may also be at least partly in blocked form.

Preference extends to

1) Polyisocyanates containing isocyanurate groups and derived from aromatic, aliphatic and/or cycloaliphatic diisocyanates. Particular preference is given in this context to the corresponding aliphatic and/or cycloaliphatic isocyanatoisocyanurates and in particular to those based on hexamethylene diisocyanate and isophorone diisocyanate. The isocyanurates present are, in particular, tris-isocyanatoalkyl and/or tris-isocyanatocycloalkyl isocyanurates, which constitute cyclic trimers of the diisocyanates, or are mixtures with their higher homologues containing more than one isocyanurate ring. The isocyanatoisocyanurates generally have an NCO content of 10% to 30% by weight, in particular 15% to 25% by weight, and an average NCO functionality of 2.6 to 8.

2) Uretdione diisocyanates with aromatically, aliphatically and/or cycloaliphatically attached isocyanate groups, preferably aliphatically and/or cycloaliphatically attached, and in particular those derived from hexamethylene diisocyanate or isophorone diisocyanate. Uretdione diisocyanates are cyclic dimerization products of diisocyanates.

The uretdione diisocyanates can be used as a sole component or in a mixture with other polyisocyanates, particularly those specified under 1).

3) Polyisocyanates containing biuret groups and having aromatically, cycloaliphatically or aliphatically attached, preferably cycloaliphatically or aliphatically attached, isocyanate groups, especially tris(6-isocyanatohexyl)biuret or its mixtures with its higher homologues. These polyisocyanates containing biuret groups generally have an NCO content of 18% to 22% by weight and an average NCO functionality of 2.8 to 4.5.

4) Polyisocyanates containing urethane and/or allophanate groups and having aromatically, aliphatically or cycloaliphatically attached, preferably aliphatically or cycloaliphatically attached, isocyanate groups, such as may be obtained, for example, by reacting excess amounts of hexamethylene diisocyanate or of isophorone diisocyanate with mono- or polyhydric alcohols such as, for example, methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethylhexanol, n-pentanol, stearyl alcohol, cetyl alcohol, lauryl alcohol, ethylene glycol monomethyl ether, ethylene glycol monoethyl ether, 1,3-propanediol monomethyl ether, cyclopentanol, cyclohexanol, cyclooctanol, cyclododecanol, trimethylolpropane, neopentyl glycol, pentaerythritol, 1,4-butanediol, 1,6-hexanediol, 1,3-propanediol, 2-ethyl-1,3-propanediol, 2-methyl-1,3-propanediol, ethylene glycol, diethylene glycol, triethylene glycol, tetraethylene glycol, pentaethylene glycol, glycerol, 1,2-dihydroxypropane, 2,2-dimethyl-1,2-ethanediol, 1,2-butanediol, 1,4-butanediol, 3-methylpentane-1,5-diol, 2-ethylhexane-1,3-diol, 2,4-diethyloctane-1,3-diol, hydroxypivalic acid neopentyl glycol ester, ditrimethylolpropane, dipentaerythritol, 2,2-bis(4-hydroxycyclohexyl)propane, 1,1-, 1,2-, 1,3-, and 1,4-cyclohexanedimethanol, 1,2-, 1,3- or 1,4-cyclohexanediol or mixtures thereof. These polyisocyanates containing urethane and/or allophanate groups generally have an NCO content of 12% to 20% by weight and an average NCO functionality of 2.5 to 4.5.

5) Polyisocyanates comprising oxadiazinetrione groups, derived preferably from hexamethylene diisocyanate or isophorone diisocyanate. Polyisocyanates of this kind comprising oxadiazinetrione groups are accessible from diisocyanate and carbon dioxide.

6) Polyisocyanates comprising iminooxadiazinedione groups, derived preferably from hexamethylene diisocyanate or isophorone diisocyanate. Polyisocyanates of this kind comprising iminooxadiazinedione groups are preparable from diisocyanates by means of specific catalysts.

7) Uretonimine-modified polyisocyanates.

8) Carbodiimide-modified polyisocyanates.

9) Hyperbranched polyisocyanates, of the kind known for example from DE-A1 10013186 or DE-A1 10013187.

10) Polyurethane-polyisocyanate prepolymers, from di- and/or polyisocyanates with alcohols.

11) Polyurea-polyisocyanate prepolymers.

Polyisocyanates 1) to 11) may be used in a mixture, including if appropriate in a mixture with diisocyanates.

As a result of their preparation, polyisocyanates (a) may still have a small fraction of their parent monomeric diisocyanate, this fraction being up to 5% by weight for example, more preferably up to 3% by weight, very preferably up to 2%, in particular up to 1%, especially up to 0.5%, and even up to 0.25% by weight.

Compounds suitable as component (b) include, in accordance with the invention, compounds which carry at least one isocyanate-reactive group and at least one free-radically polymerizable group.

In one preferred embodiment of the invention the compound (b) is made up of compounds having precisely one isocyanate-reactive group. The number of free-radically polymerizable unsaturated groups is at least one, preferably one to five, more preferably one to four, and very preferably one to three free-radically polymerizable unsaturated groups.

The components (b) preferably have a molar weight below 10 000 g/mol, more preferably below 5000 g/mol, very preferably below 4000 g/mol, and in particular below 3000 g/mol. Specific compounds (b) have a molar weight below 1000 or even below 600 g/mol.

Examples of possible isocyanate-reactive groups include —OH, —SH, —NH$_2$ and —NHR$^5$, R$^5$ being hydrogen or an alkyl group comprising 1 to 4 carbon atoms, such as methyl, ethyl, n-propyl, isopropyl, n-butyl, isobutyl, sec-butyl or tert-butyl, for example.

Isocyanate-reactive groups can with preference be —OH, —NH$_2$ or —NHR$^5$, more preferably —OH or —NH$_2$, and very preferably —OH.

Examples of possible components (b) include monoesters of α,β-unsaturated carboxylic acids, such as acrylic acid, methacrylic acid, crotonic acid, itaconic acid, fumaric acid, maleic acid, acrylamidoglycolic acid, methacrylamidoglycolic acid or vinyl ethers with diols or polyols, having preferably 2 to 20 C atoms and at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,2-, 1,3- or 1,4-butanediol, 1,5-pentanediol, neopentyl glycol, 1,6-hexanediol, 2-methyl-1,5-pentanediol, 2-ethyl-1,4-butanediol, 1,4-dimethylolcyclohexane, 2,2-bis(4-hydroxycyclohexyl)propane, glycerol, trimethylolethane, trimethylolpropane, trimethylolbutane, pentaerythritol, ditrimethylolpropane, erythritol, sorbitol, polyTHF having a molar weight between 162 and 2000, poly-1,3-propanediol having a molar weight between 134 and 400 or polyethylene glycol having a molar weight between 238 and 458. In addition it is also possible to use esters or amides of (meth)acrylic acid with amino alcohols, examples being 2-aminoethanol, 2-(methylamino)ethanol, 3-amino-1-propanol, 1-amino-2-propanol or 2-(2-aminoethoxy)ethanol, 2-mercaptoethanol or polyaminoalkanes, such as ethylenediamine or diethylenetriamine, or vinylacetic acid.

In addition, unsaturated polyetherols or polyesterols or polyacrylate polyols having an average OH functionality of 2 to 10 are also suitable, albeit it less preferably.

Examples of amides of ethylenically unsaturated carboxylic acids with amino alcohols are hydroxyalkyl(meth)acrylamides such as N-hydroxymethylacrylamide, N-hydroxy-methylmethacrylamide, N-hydroxyethylacrylamide, N-hydroyxethylmethacrylamide, 5-hydroxy-3-oxapentyl (meth)acrylamide, N-hydroxyalkylcrotonamides such as N-hydroxymethylcrotonamide, or N-hydroxyalkylmaleimides such as N-hydroxy-ethylmaleimide.

Preference is given to using 2-hydroxyethyl(meth)acrylate, 2- or 3-hydroxypropyl(meth)acrylate, 1,4-butanediol mono(meth)acrylate, neopentyl glycol mono(meth)acrylate, 1,5-pentandiol mono(meth)acrylate, 1,6-hexanediol mono(meth)acrylate, glycerol mono(meth)acrylate and di(meth) acrylate, trimethylolpropane mono(meth)acrylate and di(meth)acrylate, pentaerythritol mono(meth)acrylate, di(meth)acrylate, and tri(meth)acrylate, and also 4-hydroxybutyl vinyl ether, 2-aminoethyl(meth)acrylate, 2-aminopropyl(meth)acrylate, 3-aminopropyl(meth)acrylate, 4-aminobutyl(meth)acrylate, 6-aminohexyl(meth)acrylate, 2-thioethyl(meth)acrylate, 2-aminoethyl(meth)acrylamide, 2-aminopropyl(meth)acrylamide, 3-aminopropyl(meth) acrylamide, 2-hydroxyethyl(meth)acrylamide, 2-hydroxypropyl(meth)acrylamide or 3-hydroxypropyl(meth)acrylamide. Particular preference is given to 2-hydroxyethyl acrylate, 2-hydroxyethyl methacrylate, 2- or 3-hydroxypropyl acrylate, 1,4-butanediol monoacrylate, 3-(acryloyloxy)-2-hydroxypropyl(meth)acrylate, and the monoacrylates of polyethylene glycol with a molar mass of 106 to 238.

In one preferred embodiment it is also possible as compound (b) to use at least two different compounds, (b1) and (b2).

In this case the compound (b1) is a compound having precisely one isocyanate-reactive group and precisely one free-radically polymerizable unsaturated group, and compound (b2) is a compound having precisely one isocyanate-reactive group and at least two, preferably two to five, more preferably two to four, and very preferably two or three free-radically polymerizable unsaturated groups.

In one preferred embodiment component (b1) is selected from the group consisting of 2-hydroxyethyl acrylate, 2-hydroxyethyl methacrylate, 2- or 3-hydroxypropyl acrylate, and 1,4-butanediol monoacrylate, preferably from 2-hydroxyethyl acrylate and 2-hydroxyethyl methacrylate, and with particular preference is 2-hydroxyethyl acrylate, and component (b2) is selected from the group consisting of the 1,2- or 1,3-diacrylate of glycerol, trimethylolpropane diacrylate, pentaerythritol triacrylate, ditrimethylolpropane triacrylate, and dipentaerythritol pentaacrylate.

In one particularly preferred embodiment component (b2) comprises technical mixtures from the acrylation of trimethylolpropane, pentaerythritol, ditrimethylolpropane or dipentaerythritol. These are generally mixtures of completely and incompletely acrylated polyols. Very particular preference is given as compounds (b2) to technical mixtures from the acrylation of pentaerythritol which generally have an OH number to DIN 53240 of 99 to 115 mg KOH/g and are composed predominantly of pentaerythritol triacrylate and pentaerythritol tetraacrylate, and may also comprise minor amounts of pentaerythritol diacrylate. This has the advantage that pentaerythritol tetraacrylate is not incorporated into the polyurethane of the invention but instead functions simultaneously as a reactive diluent.

Compounds suitable as component (c) are those which contain precisely two isocyanate-reactive groups, examples being —OH, —SH, —NH$_2$ or —NHR$^5$, in which R$^5$ independently at each occurrence can be hydrogen, methyl, ethyl, isopropyl, n-propyl, n-butyl, isobutyl, sec-butyl or tert-butyl.

Isocyanate-reactive groups can be preferably —OH, —NH$_2$ or —NHR$^5$, more preferably —OH or —NH$_2$, and very preferably —OH.

These are, preferably, diols containing 2 to 20 carbon atoms, examples being ethylene glycol, 1,2-propanediol, 1,3-propanediol, 1,1-dimethylethane-1,2-diol, 2-butyl-2-ethyl-1,3-propanediol, 2-ethyl-1,3-propanediol, 2-methyl-1,3-propanediol, neopentyl glycol, neopentyl glycol hydroxypivalate, 1,2-, 1,3- or 1,4-butanediol, 1,6-hexanediol, 1,10-decanediol, bis(4-hydroxycyclohexane)isopropylidene, tetramethylcyclobutanediol, 1,2-, 1,3- or 1,4-cyclohexanediol, cyclooctanediol, norbornanediol, pinanediol, decalindiol, 2-ethyl-1,3-hexanediol, 2,4-diethyloctane-1,3-diol, hydroquinone, bisphenol A, bisphenol F, bisphenol B, bisphenol S, 2,2-bis(4-hydroxycyclohexyl)propane, 1,1-, 1,2-, 1,3-, and 1,4-cyclohexanedimethanol, 1,2-, 1,3- or 1,4-cyclohexanediol, polyTHF with a molar mass between 162 and 2000, poly-1,2-propanediol or poly-1,3-propanediol with a molar mass between 134 and 1178 or polyethylene glycol with a molar mass between 106 and 2000, and aliphatic diamines, such as methylene-, and isopropylidenebis(cyclohexylamine), piperazine, 1,2-, 1,3- or 1,4-diaminocyclohexane, 1,2-, 1,3- or 1,4-cyclohexane bis(methylamine), etc., dithiols or polyfunctional alcohols, secondary or primary amino alcohols, such as ethanolamine, monopropanolamine, etc., or thio alcohols, such as thioethylene glycol.

Particularly suitable here are the cycloaliphatic diols, such as bis(4-hydroxycyclohexane)isopropylidene, tetramethylcyclobutanediol, 1,2-, 1,3- or 1,4-cyclohexanediol, 1,1-, 1,2-, 1,3-, and 1,4-cyclohexanedimethanol, cyclooctanediol or norbornanediol.

The optional components (d) include at least one compound having at least three isocyanate-reactive groups.

By way of example the components (d) may have 3 to 6, preferably 3 to 5, more preferably 3 to 4, and very preferably 3 isocyanate-reactive groups.

The molecular weight of components (d) is generally not more than 2000 g/mol, preferably not more than 1500 g/mol, more preferably not more than 1000 g/mol, and very preferably not more than 500 g/mol.

These are polyols containing preferably 2 to 20 carbon atoms, examples being trimethylolbutane, trimethylolpropane, trimethylolethane, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, isomalt; particular preference is given to trimethylolpropane, pentaerythritol and glycerol, and very particular preference to trimethylolpropane.

Optional components (e) are those having, if appropriate, at least one compound having precisely one isocyanate-reactive group.

The compounds in question are preferably in monools, more preferably alkanols, and very preferably alkanols having 1 to 20, preferably 1 to 12, more preferably 1 to 6, very preferably 1 to 4, and in particular 1 to 2 carbon atoms.

Examples thereof are methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethylhexanol, cyclopentanol, cyclohexanol, cyclooctanol, cyclododecanol, ethylene glycol monomethyl ether, ethylene glycol monoethyl ether, diethylene glycol, 1,3-propanediol monomethyl ether, preference being given to methanol, ethanol, isopropanol, n-propanol, n-butanol, tert-butanol, n-hexanol, 2-ethylhexanol, cyclopentanol, cyclohexanol, and cyclododecanol, particular preference to methanol, ethanol, isopropanol, n-propanol, n-butanol, and tert-butanol, very particular preference to methanol and ethanol, and methanol in particular.

In one preferred embodiment the monools may be the stated cycloaliphatic alcohols, preferably cyclopentanol or cyclohexanol, more preferably cyclohexanol.

In another preferred embodiment the monools may be the stated aliphatic alcohols having 6 to 20 carbon atoms, with particular preference those having 8 to 20 carbon atoms, with very particular preference those having 10 to 20 carbon atoms.

In one particularly preferred embodiment the monools are the stated aliphatic alcohols, with very particular preference those with 1 to 4 carbon atoms, especially methanol.

(f) The compounds (f) include at least one compound which has at least one organosilicon group and at least one isocyanate-reactive group.

Isocyanate-reactive groups may be preferably —OH, —NH$_2$ or —NHR$^5$, more preferably —OH or —NH$_2$, and very preferably —OH.

The compounds (f) comprise on average at least one, preferably at least one, more preferably one to 20, with very particular preference one to 10, in particular one to 6, especially one to 4, often one to 3, and even precisely one isocyanate-reactive group.

Furthermore, the compounds (f) have at least one organosilicon group, preferably 1 to 50, more preferably 1 to 40, very preferably 1 to 30, in particular 1 to 20, especially 1 to 10, even 1 to 8, and often 1 to 7 organosilicon groups.

By organosilicon groups are meant those atomic groups which are composed of at least one silicon atom and which are substituted by any desired, optionally substituted alkyl, aryl or cycloalkyl groups. In accordance with the IUPAC Rules D-6, this also comprises those compounds in which the carbon is linked via oxygen, nitrogen or sulfur atoms to the silicon.

In the compounds (f) it is possible for the organosilicon groups preferably as siloxanes having at least one Si—O—C bond or, likewise with preference, in the form of polysiloxanes, in other words comprising at least one Si—O—Si—O—C moiety (siloxane linkage), the silicon atoms in that case being able to be substituted by any desired, optionally substituted alkyl, aryl or cycloalkyl groups.

The organosilicon compounds are preferably of the formula

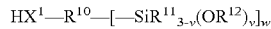

in which
X$^1$ is oxygen (O), sulfur (S), imino (—NH—) or substituted imino (—NR$^5$—), preferably oxygen or imino, more preferably oxygen,
R$^{10}$ is a (w+1)-valent organic radical,
R$^{11}$ and R$^{12}$ independently of one another are optionally substituted alkyl, cycloalkyl or aryl,
v is a positive integer from 1 to 3, preferably 2 or 3, and more preferably 3, and
w is a positive integer from 1 to 5, preferably 1 to 4, more preferably 1 to 3, very preferably 1 to 2, and in particular 1.

R$^{10}$ may here be C$_1$-C$_{20}$-alkylene, C$_6$-C$_{12}$-arylene, C$_3$-C$_{12}$-cycloalkylene.

C$_1$-C$_4$-alkylene therein is linear or branched alkylene, e.g., methylene, 1,2-ethylene, 1,2- or 1,3-propylene, 1,2-, 1,3- or 1,4-butylene, 1,1-dimethyl-1,2-ethylene or 1,2-dimethyl-1,2-ethylene, 1,6-hexylene, 1,8-octylene, 1,10-decylene, or 1,12-dodecylene. Preference is given to 1,2-ethylene, 1,2- or 1,3-propylene, 1,4-butylene, and 1,6-hexylene, particular preference to 1,2-ethylene.

C$_3$-C$_{12}$ cycloalkylene is for example cyclopropylene, cyclopentylene, cyclohexylene, cyclooctylene and cyclododecylene.

C$_6$-C$_{12}$ arylene therein is 1,2-, 1,3- or 1,4-phenylene, 4,4'-biphenylene, 4,4'-bisphenylmethylene, 1,3-, 1,4- or 1,5-naphthylene, 3,3'-dimethyl-4,4'-diphenylene, 3,3'-dichloro-4,4'-diphenylene, 2,4- or 2,6-pyridyl, 1,4-anthraquinonediyl, m- or p-tolylene, 4,6-dimethyl-1,3-phenylene, 4,6-dichloro-1,3-phenylene, 5-chloro-1,3-phenylene, 5-hydroxy-1,3-phenylene, 5-methoxy-1,3-phenylene, 2,3-dimethyl-1,4-phenylene, m- or p-xylylene, methylene-di-p-phenylene, isopropylidene-di-p-phenylene, thio-di-p-phenylene, dithio-di-p-phenylene, sulfo-di-p-phenylene, carbonyl-di-p-phenylene, or 4,4'-bisphenyl ether.

Preferred radicals R$^{11}$ and R$^{12}$ are, independently of one another, methyl, ethyl, n-propyl, n-butyl, tert-butyl, thexyl, and phenyl.

Examples of compounds (f) are N-cyclohexylaminomethylmethyldiethoxysilane, N-cyclohexylaminomethyltriethoxysilane, N-phenylaminomethyltrimethoxysilane, N-trimethoxysilyl methyl-O-methylcarbamate, 1-[3-(trimethoxysilyl)propyl]urea, 3-(diethoxymethylsilyl)propylamine, N-dimethoxy(methyl)silylmethyl-O-methylcarbamate, N-(2-aminoethyl)-3-aminopropyltrimethoxysilane, N-cyclohexyl-3-aminopropyltrimethoxysilane, 3-aminopropyltrimethoxysilane, 3-aminopropyltriethoxysilane, N-(2-aminoethyl)-3-aminopropyldimethoxysilane, (isocyanatomethyl)methyldimethoxysilane, 3-isocyanatopropyltrimethoxysilane, 3-glycidoloxypropyltrimethoxysilane, 3-glycidoloxypropyltriethoxysilane, 3-(triethoxysilyl)propylsuccinic anhydride, bis[3-(triethoxysilyl)propyl]amine or bis[3-(trimethoxysilyl)propyl]amine.

Preferred compounds (f) are those obtainable by reacting at least one compound (f1) containing at least one silicon atom and at least one Si—H group with at least one compound (f2) which carries at least one isocyanate-reactive group and at least one vinylic group.

Preferred compounds (f1) have 1 to 6, preferably 1 to 4, more preferably 1 to 3, very preferably 1 to 3, in particular 1 to 2, and especially 2 Si—H groups.

Preferred compounds (f1) have 1 to 50, preferably 2 to 40, more preferably 3 to 30, very preferably 3 to 20, in particular 4 to 10, especially 4 to 8, and even 5 to 7 silicon atoms.

In one preferred embodiment the compounds (f1) comprise at least one organic polysiloxane hydride of formula (I)

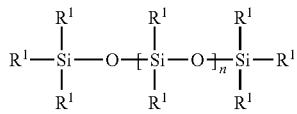

in which
$R^1$ independently at each occurrence can be hydrogen, hydroxyl (—OH), $C_1$-$C_{18}$ alkyl, $C_6$-$C_{12}$ aryl, $C_5$-$C_{12}$ cycloalkyl, $C_1$-$C_{18}$ alkoxy or $C_6$-$C_{12}$ aryloxy and
n can be an integer from 0 to 100
in which at least one of the groups $R^1$ is hydrogen.

In compounds of the formula (I) the ratio of groups $R^1$ that are hydrogen to groups $R^1$ that are not hydrogen is preferably 0.1:1 to 10:1.

With particular preference the compounds (f1) include at least one organic polysiloxane hydride of formula (II)

$$R^2-\underset{\underset{R^2}{|}}{\overset{\overset{R^2}{|}}{Si}}-O{\left[\underset{\underset{R^2}{|}}{\overset{\overset{R^2}{|}}{Si}}-O\right]}_n{\left[\underset{\underset{H}{|}}{\overset{\overset{R^2}{|}}{Si}}-O\right]}_m\underset{\underset{R^2}{|}}{\overset{\overset{R^2}{|}}{Si}}-R^2$$

or formula (III)

$$H-\underset{\underset{R^2}{|}}{\overset{\overset{R^2}{|}}{Si}}-O{\left[\underset{\underset{R^2}{|}}{\overset{\overset{R^2}{|}}{Si}}-O\right]}_n{\left[\underset{\underset{H}{|}}{\overset{\overset{R^2}{|}}{Si}}-O\right]}_p\underset{\underset{R^2}{|}}{\overset{\overset{R^2}{|}}{Si}}-H$$

in which
$R^2$ independently at each occurrence can be hydroxyl (—OH), $C_1$-$C_{18}$ alkyl, $C_6$-$C_{12}$ aryl, $C_5$-$C_{12}$ cycloalkyl, $C_1$-$C_{18}$ alkoxy, and $C_6$-$C_{12}$ aryloxy,
n can be an integer from 0 to 50,
m can be an integer from 1 to 50, and
p can be an integer from 0 to 50.

In compounds of the formula (II) or (III) the ratio of hydrogen atoms attached to silicon atoms to groups $R^2$ is preferably 0.1:1 to 10:1.

In these formulae
$C_1$-$C_{18}$ alkyl is for example methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hetadecyl, octadecyl, 1,1-dimethylpropyl, 1,1-dimethylbutyl or 1,1,3,3-tetramethylbutyl.

$C_1$-$C_{18}$ alkoxy is for example methoxy, ethoxy, n-propyloxy, isopropyloxy, n-butyloxy, isobutyloxy, sec-butyloxy or tert-butyloxy.

$C_6$-$C_{12}$ aryl is for example phenyl, tolyl, xylyl, α-naphthyl, β-naphthyl, 4-diphenylyl, methylphenyl, dimethylphenyl, trimethylphenyl, ethylphenyl, diethylphenyl, isopropylphenyl, tert-butylphenyl, dodecylphenyl, methylnaphthyl, isopropylnaphthyl, 6-dimethylphenyl or 2,4,6-trimethylphenyl.

$C_5$-$C_{12}$ cycloalkyl is for example cyclopentyl, cyclohexyl, cyclooctyl, cyclododecyl, methylcyclopentyl, dimethylcyclopentyl, methylcyclohexyl, dimethylcyclohexyl, diethylcyclohexyl or butylcyclohexyl.

$C_6$-$C_{12}$ aryloxy is for example phenyloxy, o-, m- or p-tolyloxy.

Preferably $R^1$ and $R^2$ independently of one another are hydroxyl, $C_1$-$C_{18}$ alkyl, $C_1$-$C_{18}$ alkoxy or $C_6$-$C_{12}$ aryl, more preferably $C_1$-$C_4$ alkyl or phenyl, very preferably $C_1$-$C_4$ alkyl.

$C_1$ to $C_4$ alkyl for the purposes of this specification means methyl, ethyl, propyl, isopropyl, n-butyl, sec-butyl or tert-butyl, preferably methyl, ethyl, n-butyl or tert-butyl, more preferably methyl or ethyl, and very preferably methyl.

n is preferably an integer from 1 to 50, more preferably from 1 to 30, very preferably from 2 to 20, in particular from 2 to 10, and especially from 3 to 5;
m is preferably an integer from 1 to 30, more preferably from 1 to 20, very preferably from 1 to 10, in particular from 1 to 5, and especially m is 1; and
p is preferably an integer from 0 to 30, more preferably from 0 to 20, very preferably from 0 to 10, in particular from 0 to 5, and especially p is 0.

Examples of polysiloxane hydrides are 1,1,3,3-tetramethyldisiloxane, polysiloxane hydrides in which n is 3 or 4 which available commercially under the trade name Masilwax® BASE from PPG Industries Inc.

The formulae (I), (II), and (III) are schematic, and there is no intention to indicate that the parts in parentheses are necessarily blocks, although blocks can be used where desired. In many cases the compound has a more or less random construction, particularly if more than a few siloxane units are used, and if mixtures are used. In those cases where more than a few siloxane units are used and it is desired to form blocks, oligomers are formed first of all and then they are joined to form the block compound. Through a rational selection of reactants it is possible to use compounds having an alternating structure or blocks of alternating structure.

The compounds of the formula (I), (II) or (III) can therefore be alternating, random or block polymers, preferably random or block polymers, and with particular preference random polymers.

The compounds (f2) are preferably compounds of the formula (IV)

Vin-$R^4$—Y in which
Vin is a vinylic group,
$R^4$ is a single bond, an oxygen atom, a nitrogen atom, $C_1$-$C_{20}$ alkylene, $C_6$-$C_{12}$-arylene, $C_3$-$C_{12}$ cycloalkylene, or $C_2$-$C_{20}$ alkylene interrupted by one or more oxygen and/or sulfur atoms and/or by one or more substituted or unsubstituted imino groups and/or by one or more —(CO)—, —O(O)O—, —(NH)(CO)O—, —O(CO)(NH)—, —O(O)— or —(O)O— groups, and
Y is an isocyanate-reactive group.

(g) The compounds (g) are compounds having at least one isocyanate-reactive group and at least one dispersive group.

Compounds referred to as component (g) have precisely one isocyanate-reactive group and precisely one dispersive group.

The dispersive groups can be
(g1) anionic groups or groups which can be converted into an anionic group,
(g2) cationic groups or groups which can be converted into a cationic group, or
(g3) nonionic groups.

It will be appreciated that mixtures or hybrid forms are also conceivable.

Preferred dispersive groups are (g1) or (g3), with particular preference either (g1) or alternatively (g3).

Compounds (g1) comprise precisely one isocyanate-reactive group, and at least one hydrophilic group which is anionic or can be converted into an anionic group. Examples of the compounds in question are those as described in EP-A1 703 255, particularly from page 3 line 54 to page 4 line 38 therein, in DE-A1 197 24 199, particularly from page 3 line 4 to line 30 therein, in EP-A1 40 10 783, particularly from column 3 line 3 to line 40 therein, in DE-A1 41 13 160, particularly from column 3 line 63 to column 4 line 4 therein, and in EP-A2 548 669, particularly from page 4 line 50 to page 5 line 6 therein. These documents are hereby expressly incorporated by reference as part of the present disclosure content.

Preferred compounds (g1) are those having the general formula $$RG\text{-}R^3\text{-}DG$$

in which
RG is at least one isocyanate-reactive group,
DG is at least one dispersive group, and
$R^3$ is an aliphatic, cycloaliphatic or aromatic radical comprising 1 to 20 carbon atoms.

Examples of isocyanate-reactive groups RG are —OH, —SH, —NH$_2$ or —NHR$^5$, wherein R$^5$ has the definition recited above, but can be different than the radical used there; preferably —OH, —NH$_2$ or —NHR$^5$, more preferably —OH or —NH$_2$, and very preferably —OH.

Examples of DG are —COOH, —SO$_3$H or —PO$_3$H and also their anionic forms, with which any desired counterion may be associated, for example, Li$^+$, Na$^+$, K$^+$, Cs$^+$, Mg$^{2+}$, Ca$^{2+}$ or Ba$^{2+}$. As associated counterion it is additionally possible to have quaternary ammonium ions or ammonium ions derived from ammonia or amines, especially tertiary amines, such as, for example, ammonium, methylammonium, dimethylammonium, trimethylammonium, ethylammonium, diethylammonium, triethylammonium, tributylammonium, diisopropylethylammonium, benzyldimethylammonium, monoethanolammonium, diethanolammonium, triethanolammonium, hydroxyethyldimethylammonium, hydroxyethyldiethylammonium, monopropanolammonium, dipropanolammonium, tripropanolammonium, piperidinium, piperazinium, N,N'-dimethylpiperazinium, morpholinium, pyridinium, tetramethylammonium, triethylmethylammonium, 2-hydroxyethyltrimethylammonium, bis(2-hydroxyethyl)dimethylammonium, and tris(2-hydroxyethyl)methylammonium.

$R^3$ is preferably methylene, 1,2-ethylene, 1,2-propylene, 1,3-propylene, 1,2-butylene, 1,4-butylene, 1,3-butylene, 1,6-hexylene, 1,8-octylene, 1,12-dodecylene, 1,2-phenylene, 1,3-phenylene, 1,4-phenylene, 1,2-naphthylene, 1,3-naphthylene, 1,4-naphthylene, 1,6-naphthylene, 1,2-cyclopentylene, 1,3-cyclopentylene, 1,2-cyclohexylene, 1,3-cyclohexylene or 1,4-cyclohexylene.

The component (g1) is preferably, for example, hydroxyacetic acid, tartaric acid, lactic acid, 3-hydroxypropionic acid, hydroxypivalic acid, mercaptoacetic acid, mercaptopropionic acid, thiolactic acid, mercaptosuccinic acid, glycine, iminodiacetic acid, sarcosine, alanine, β-alanine, leucine, isoleucine, aminobutyric acid, hydroxysuccinic acid, hydroxydecanoic acid, ethylenediaminetriacetic acid, hydroxydodecanoic acid, hydroxyhexadecanoic acid, 12-hydroxystearic acid, aminonaphthalenecarboxylic acid, hydroxyethanesulfonic acid, hydroxypropanesulfonic acid, mercaptoethanesulfonic acid, mercaptopropanesulfonic acid, aminomethanesulfonic acid, taurine, aminopropanesulfonic acid, N-alkylated or cycloalkylated aminopropanesulfonic or aminoethanesulfonic acids, examples being N-cyclohexylaminoethanesulfonic acid or N-cyclohexylaminopropanesulfonic acid, and also their alkali metal, alkaline earth metal or ammonium salts, and with particular preference the stated monohydroxycarboxylic and monohydroxysulfonic acids, and also monoaminocarboxylic and monoaminosulfonic acids.

For the preparation of the dispersion, the aforementioned acids, if not already in salt form, are partly or fully neutralized, preferably with alkali metal salts or amines, preferably tertiary amines.

Compounds (g2) comprise precisely one isocyanate-reactive group, and at least one hydrophilic group which is cationic or can be converted into a cationic group, and are, for example, those compounds as described in EP-A1 582 166, particularly from page 5 line 42 to page 8 line 22 therein, and in particular from page 9 line 19 to page 15 line 34 therein, or in EP-A1 531 820, particularly from page 3 line 21 to page 4 line 57 therein, or in DE-A1 42 03 510, particularly from page 3 line 49 to page 5 line 35 therein. These documents are hereby expressly incorporated by reference as part of the present disclosure content.

Potentially cationic compounds (g2) of particular practical significance are especially those containing tertiary amino groups, examples including the following. N-hydroxy-alkyldialkylamines, N-aminoalkyldialkylamines, the alkyl radicals and alkanediyl units of these tertiary amines being composed, independently of one another, of 2 to 6 carbon atoms. Additionally suitable are polyethers containing tertiary nitrogen atoms and a terminal hydroxyl group, as, for example, by alkoxylation of secondary amines. Polyethers of this kind generally have a molar weight situated between 500 and 6000 g/mol.

These tertiary amines, either using acids, preferably strong mineral acids such as phosphoric acid, sulfuric acid or hydrohalic acids, strong organic acids, such as formic, acetic or lactic acid, for example, or by reaction with suitable quaternizing agents such as $C_1$ to $C_6$ alkyl halides, e.g., bromides or chlorides, or di-$C_1$ to $C_6$ alkyl sulfates or di-$C_1$ to $C_6$ alkyl carbonates, are converted into the ammonium salts.

Suitable compounds (g2) having isocyanate-reactive amino groups include aminocarboxylic acids such as lysine, β-alanine, the adducts of aliphatic diprimary diamines with α,β-unsaturated carboxylic acids that are specified in DE-A2034479, such as N-(2-aminoethyl)-2-aminoethanecarboxylic acid, and also the corresponding N-aminoalkylaminoalkylcarboxylic acids, the alkanediyl units being composed of 2 to 6 carbon atoms.

Where monomers containing potentially ionic groups are employed, their conversion into the ionic form may take place before, during, but preferably after the isocyanate polyaddition, since the solubility of the ionic monomers in the reaction mixture is frequently no more than poor. With particular preference the carboxylate groups are in the form of their salts with an alkali metal or ammonium counterion.

Compounds (g3) are monofunctional polyalkylene oxide polyether alcohols obtainable by alkoxylating suitable starter molecules.

Suitable starter molecules for preparing such polyalkylene oxide polyether alcohols are thiol compounds, monohydroxy compounds of the general formula

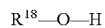

or secondary monoamines of the general formula

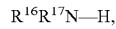

in which
$R^{16}$, $R^{17}$, and $R^{18}$ independently of one another are each independently of one another $C_1$-$C_{18}$ alkyl, $C_2$-$C_{18}$ alkyl optionally interrupted by one or more oxygen and/or sulfur atoms and/or by one or more substituted or unsubstituted imino groups, $C_6$-$C_{12}$ aryl, $C_5$-$C_{12}$ cycloalkyl or a five- to six-membered heterocycle containing oxygen, nitrogen and/or sulfur atoms, or $R^{16}$ and $R^{17}$ together form a ring which is unsaturated, saturated or aromatic and optionally interrupted by one or more oxygen and/or sulfur atoms and/or by one or more substituted or unsubstituted imino groups, it being possible for the stated radicals in each case to be substituted by functional groups, aryl, alkyl, aryloxy, alkyloxy, halogen, heteroatoms and/or heterocycles.

Preferably $R^{16}$, $R^{17}$, and $R^{18}$ independently of one another are $C_1$ to $C_4$ alkyl, and with particular preference $R^{16}$, $R^{17}$, and $R^{18}$ are methyl.

Monofunctional starter molecules suitable by way of example may be monoalcohols which are saturated, i.e., comprise no double or triple C—C or C-heteroatom bonds, such as methanol, ethanol, n-propanol, isopropanol, n-butanol, isobutanol, sec-butanol, the isomeric pentanols, hexanols, octanols, and nonanols, n-decanol, n-dodecanol, n-tetradecanol, n-hexadecanol, n-octadecanol, cyclohexanol, cyclopentanol, the isomeric methylcyclohexanols or hydroxymethylcyclohexane, 3-ethyl-3-hydroxymethyloxetane, or tetrahydrofurfuryl alcohol; aromatic alcohols such as phenol, the isomeric cresols or methoxyphenols, araliphatic alcohols such as benzyl alcohol, anisyl alcohol or cinnamyl alcohol; secondary monoamines such as dimethylamine, diethylamine, dipropylamine, diisopropylamine, di-n-butylamine, diisobutylamine, bis-(2-ethylhexyl)amine, N-methyl- and N-ethylcyclohexylamine or dicyclohexylamine, heterocylic secondary amines such as morpholine, pyrrolidine, piperidine or 1H-pyrazole, and also amino alcohols such as 2-dimethylaminoethanol, 2-diethylaminoethanol, 2-diisopropylaminoethanol, 2-dibutylaminoethanol, 3-(dimethylamino)-1-propanol or 1-(dimethylamino)-2-propanol.

Preferred starter molecules are alcohols having not more than 6 carbon atoms, more preferably not more than 4 carbon atoms, very preferably not more than 2 carbon atoms, and especially methanol.

Alkylene oxides suitable for the alkoxylation reaction are ethylene oxide, propylene oxide, isobutylene oxide, vinyloxirane and/or styrene oxide, which can be employed in any order (for the preparation of block copolymers) or else in a mixture (for the preparation of random copolymers) in the alkoxylation reaction.

Preferred alkylene oxides are ethylene oxide, propylene oxide, and mixtures thereof, with particular preference being given to ethylene oxide.

Preferred polyether alcohols are those based on polyalkylene oxide polyether alcohols prepared using saturated aliphatic or cycloaliphatic alcohols of the kind specified above as starter molecules. Very particular preference is given to those based on polyalkylene oxide polyether alcohols prepared using saturated aliphatic alcohols having 1 to 4 carbon atoms in the alkyl radical. Especial preference is given to polyalkylene oxide polyether alcohols prepared starting from methanol.

The monohydric polyalkylene oxide polyether alcohols contain on average in general at least 2 alkylene oxide units, preferably 5 ethylene oxide units, per molecule, in copolymerized form, with particular preference at least 7, and with very particular preference at least 10.

The monohydric polyalkylene oxide polyether alcohols contain on average in general up to 90 alkylene oxide units, preferably ethylene oxide units, per molecule, in copolymerized form, preferably up to 45, more preferably up to 40, and very preferably up to 30.

The molar weight of the monohydric polyalkylene oxide polyether alcohols is preferably up to 4000, with particular preference not above 2000 g/mol, with very particular preference not below 500, and in particular 1000±500 g/mol.

Preferred polyether alcohols are therefore compounds of the formula

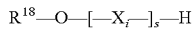

in which
$R^{18}$ is as defined above,
s is an integer from 2 to 90, preferably 5 to 45, more preferably 7 to 40, and very preferably 10 to 30, and
each $X_i$, independently of one another for i=1 to s, may be selected from the group consisting of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O—, and —CHPh-$CH_2$—O—, preferably from the group —$CH_2$—$CH_2$—O—, —$CH_2$—$CH(CH_3)$—O— and —$CH(CH_3)$—$CH_2$—O—, and more preferably —$CH_2$—$CH_2$—O—
in which Ph is phenyl and Vin is vinyl.

In one particular embodiment of the present invention the compound (g) may also be an alkoxylated (meth)acrylate, such as, for example, one of the formula

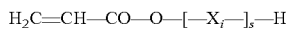

or

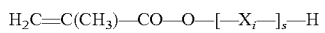

in which
$X_i$ and s may adopt the definitions stated above.

Examples thereof are polyethylene oxide mono(meth) acrylate (PEA6/PEM6, Laporte Performance Chemicals Ltd.), polypropylene oxide mono(meth)acrylate (PPA6/PPM5S, Laporte Performance Chemicals Ltd.) or polyalkylene oxide mono(meth)acrylate (PEM63P, Laporte Performance Chemicals Ltd.).

Alkoxylated (meth)acrylates of this kind are preferably attached at least partly via urethane groups, but not via allophanate groups.

Preference is given, however, to the abovementioned saturated polyalkylene oxide polyether alcohols.

The polyurethanes which can be used in accordance with the invention are obtained by reacting components (a), (b), and (f) and also, if appropriate (c) and/or (d) and/or (e) and/or (g) with one another.

The molar composition (a):(b):(f):(c):(d):(e):(g) per mole of reactive isocyanate groups in (a) is generally as follows:
(b) 1-50, preferably 5-40, more preferably 10-37.5, and in particular 15-33 mol % of isocyanate-reactive groups,
(c) 0-50, preferably 0-30, more preferably 0-25, and in particular 0-20 mol % of isocyanate-reactive groups,
(d) 0-10, preferably 0-5, more preferably 0-3, and in particular 0-2 mol % of isocyanate-reactive groups,
(e) 0-5, preferably 0-4, more preferably 0-3, and in particular 0-2 mol % of isocyanate-reactive groups,
(f) 1-40, preferably 2-35, more preferably 5-30, and in particular 10-25 mol % of isocyanate-reactive groups,
(g) 0-25, preferably 0-20, more preferably 1-15, and in particular 5-15 mol % of isocyanate-reactive groups,
with the proviso that the sum of the isocyanate-reactive groups corresponds to the number of isocyanate groups in (a).

The formation of the adduct of isocyanato-functional compound and the compound comprising isocyanate-reactive groups takes place in general by mixing of the components in any order, if appropriate at elevated temperature.

The compound comprising isocyanate-reactive groups is preferably added here to the isocyanato-functional compound, preferably in two or more steps.

With particular preference the isocyanato-functional compound is introduced to start with and the compounds comprising isocyanate-reactive groups are added. In particular the isocyanate-functional compound (a) is introduced to start with and then (b) and/or (f) are added. Thereafter it is possible if appropriate to add desired further components.

The reaction is carried out in general at temperatures of between 5 and 100° C., preferably between 20 to 90° C., more preferably between 40 and 80° C., and in particular between 60 and 80° C.

It is preferred here to operate under anhydrous conditions.

Anhydrous here means that the water content of the reaction system is not more than 5% by weight, preferably not more than 3% by weight, and more preferably not more than 1% by weight; with very particular preference it is not more than 0.75% and in particular not more than 0.5% by weight.

The reaction is carried out preferably in the presence of at least one oxygenous gas, examples being air or air/nitrogen mixtures, or mixtures of oxygen or an oxygenous gas with a gas which is inert under the reaction conditions, having an oxygen content of below 15%, preferably below 12%, more preferably below 10%, very preferably below 8%, and in particular below 6% by volume.

The reaction can also be carried out in the presence of an inert solvent, examples being acetone, isobutyl methyl ketone, toluene, xylene, butyl acetate, methoxypropyl acetate or ethoxyethyl acetate. With preference, however, the reaction is carried out in the absence of a solvent.

In one preferred embodiment the reaction of (a) with (b) is carried out under allophanatization conditions.

Typical catalysts for such a reaction are organozinc compounds, such as zinc acetylacetonate or zinc 2-ethylcaproate, or a tetraalkylammonium compound, such as N,N,N-trimethyl-N-2-hydroxypropylammonium hydroxide or such as N,N,N-trimethyl-N-2-hydroxypropylammonium 2-ethylhexanoate, or organotin compounds, such as dibutyltin dilaurate.

In another preferred embodiment compounds are used of the kind described in WO 00/39183, p. 4, l. 3 to p. 10, l. 19, the disclosure content of which is hereby made part of the present specification. Particular preference among these compounds is given to those having as constituent components at least one (cyclo)aliphatic isocyanate which contains allophanate groups, and at least one hydroxyalkyl(meth)acrylate, very particular preference being given to products 1 to 9 in table 1 on p. 24 of WO 00/39183.

The polyurethanes of the invention can be used for coating a variety of substrates, such as wood, wood veneer, paper, paperboard, cardboard, textile, leather, nonwoven, plastics surfaces, glass, ceramic, mineral building materials, and coated or uncoated metals.

In the case of use in coating materials, the polyurethanes of the invention can be employed in particular in primers, surfacers, pigmented topcoat materials, and clearcoat materials in the fields of automotive refinish or the finishing of large vehicles. Coating materials of this kind are particularly suitable for applications requiring a particularly high level of reliability in application, external weathering resistance, optical qualities, resistance to solvents, chemicals, and water, as in automotive refinish and the finishing of large vehicles.

The coating compositions of the invention are suitable for coating substrates such as wood, paper, textile, leather, nonwoven, plastic surfaces, glass, ceramic, mineral building materials, such as cement moldings and fiber-cement slabs, or coated or uncoated metals, preferably plastics or metals, particularly in the form of thin sheets, and with particular preference metals.

The present invention further provides these substrates, coated with a coating composition of the invention.

The coating compositions of the invention are suitable as or in exterior coatings, in other words in those applications involving exposure to daylight, preferably parts of buildings, interior coatings, and coatings on vehicles and aircraft. In particular the coating compositions of the invention are used as or in automotive clearcoat and topcoat material(s). Further preferred fields of use are can coating and coil coating.

In particular they are suitable as primers, surfacers, pigmented topcoat materials, and clearcoat materials in the sectors of industrial coating, wood coating, automotive finishing, especially OEM finishing, or decorative coating. The coating materials are especially suitable for applications requiring a particularly high level of reliability in application, outdoor weathering resistance, optical qualities, scratch resistance, solvent resistance and/or chemical resistance.

Thus, vehicles and aircraft coated with a coating composition of the invention are likewise part of the present invention.

The present invention additionally provides radiation-curable coating compositions comprising
  at least one polyurethane of the invention,
  if appropriate, at least one compound having one or more than one free-radically polymerizable double bond,
  if appropriate at least one photoinitiator, and
  if appropriate, further, typical coatings additives.

As catalysts for the curing of the organosilyl groups it is possible in addition to add acids, with or without masking. Preference for this purpose is given to organic sulfonic acids, such as methanesulfonic acid, trifluoromethanesulfonic acid, benzenesulfonic acid, p-toluenesulfonic acid or 4-dodecylbenzenesulfonic acid. Further examples are masked sulfonic acids, of the kind offered, for example, as Nacure® products by King Industries. Acidic catalysts are added generally in amounts up to 2% by weight, based on the coating composition, preferably up to 1.5% by weight.

The polyurethanes of the invention can be used as the sole binder or in combination with a further free-radically polymerizable compound.

Compounds having one or more than one free-radically polymerizable double bond are, for example, compounds having 1 to 6, preferably 1 to 4, and more preferably 1 to 3 free-radically polymerizable groups.

Examples of free-radically polymerizable groups include vinyl ether or (meth)acrylate groups, preferably (meth)acrylate groups, and more preferably acrylate groups.

Free-radically polymerizable compounds are frequently subdivided into monofunctional polymerizable compounds (compounds having one free-radically polymerizable double bond) and multifunctional polymerizable compounds (compounds having more than one free-radically polymerizable double bond).

Monofunctional polymerizable compounds are those having precisely one free-radically polymerizable group; multifunctional polymerizable compounds are those having more than one, preferably at least two, free-radically polymerizable groups.

Examples of monofunctional polymerizable compounds are esters of (meth)acrylic acid with alcohols having 1 to 20 C atoms, examples being methyl(meth)acrylate, ethyl(meth)acrylate, butyl(meth)acrylate, 2-ethylhexyl(meth)acrylate, 2-hydroxyethyl(meth)acrylate, 2-hydroxypropyl(meth)acrylate, 4-hydroxybutyl(meth)acrylate, dihydrodicyclopentadienyl acrylate, vinylaromatic compounds, e.g., styrene, divinylbenzene, α,β-unsaturated nitriles, e.g., acrylonitrile, methacrylonitrile, α,β-unsaturated aldehydes, e.g., acrolein, methacrolein, vinyl esters, e.g., vinyl acetate, vinyl propionate, halogenated ethylenically unsaturated compounds, e.g., vinyl chloride, vinylidene chloride, conjugated unsaturated compounds, e.g., butadiene, isoprene, chloroprene, monounsaturated compounds, e.g., ethylene, propylene, 1-butene, 2-butene, isobutene, cyclic monounsaturated compounds, e.g. cyclopentene, cyclohexene, cyclododecene, N-vinylformamide, allylacetic acid, vinylacetic acid, monoethylenically unsaturated carboxylic acids having 3 to 8 C atoms and their water-soluble alkali metal, alkaline earth metal or ammonium salts, for example: acrylic acid, methacrylic acid, dimethylacrylic acid, ethacrylic acid, maleic acid, citraconic acid, methylenemalonic acid, crotonic acid, fumaric acid, mesaconic acid, and itaconic acid, maleic acid, N-vinylpyrrolidone, N-vinyl lactams, such as N-vinylcaprolactam, N-vinyl-N-alkylcarboxamides or N-vinylcarboxamides, such as N-vinylacetamide, N-vinyl-N-methylformamide, and N-vinyl-N-methylacetamide, or vinyl ethers, examples being methyl vinyl ether, ethyl vinyl ether, n-propyl vinyl ether, isopropyl vinyl ether, n-butyl vinyl ether, sec-butyl vinyl ether, isobutyl vinyl ether, tert-butyl vinyl ether, 4-hydroxybutyl vinyl ether, and mixtures thereof.

Preference among these is given to the esters of (meth)acrylic acid, more preferably methyl(meth)acrylate, ethyl (meth)acrylate, n-butyl(meth)acrylate, 2-ethylhexyl(meth)acrylate, and 2-hydroxyethyl acrylate, very preferably n-butyl(meth)acrylate, 2-ethylhexyl(meth)acrylate, and 2-hydroxyethyl acrylate, and especially 2-hydroxyethyl acrylate.

(Meth)acrylic acid stands in this specification for methacrylic acid and acrylic acid, preferably for acrylic acid.

Multifunctional polymerizable compounds are preferably multifunctional (meth)acrylates which carry more than 1, preferably 2-10, more preferably 2-6, very preferably 2-4, and in particular 2-3 (meth)acrylate groups, preferably acrylate groups.

These may be, for example, esters of (meth)acrylic acid with polyalcohols which, correspondingly, are at least dihydric.

Examples of polyalcohols of this kind are at least dihydric polyols, polyetherols or polyesterols or polyacrylate polyols having an average OH functionality of at least 2, preferably 3 to 10.

Examples of multifunctional polymerizable compounds are ethylene glycol diacrylate, 1,2-propanediol diacrylate, 1,3-propanediol diacrylate, 1,4-butanediol diacrylate, 1,3-butanediol diacrylate, 1,5-pentanediol diacrylate, 1,6-hexanediol diacrylate, 1,8-octanediol diacrylate, neopentyl glycol diacrylate, 1,1-, 1,2-, 1,3-, and 1,4-cyclohexanedimethanol diacrylate, 1,2-, 1,3- or 1,4-cyclohexanediol diacrylate, trimethylolpropane triacrylate, ditrimethylolpropane penta- or hexaacrylate, pentaerythritol tri- or tetraacrylate, glycerol di- or triacrylate, and also di- and polyacrylates of sugar alcohols, such as sorbitol, mannitol, diglycerol, threitol, erythritol, adonitol (ribitol), arabitol (lyxitol), xylitol, dulcitol (galactitol), maltitol or isomalt, or of polyester polyols, polyetherols, poly THF having a molar mass of between 162 and 2000, poly-1,3-propanediol having a molar mass of between 134 and 1178, polyethylene glycol having a molar mass of between 106 and 898, and also epoxy (meth)acrylates, urethane(meth)acrylates or polycarbonate (meth)acrylates.

Further examples are (meth)acrylates of compounds of formula (VIIIa) to (VIIIc)

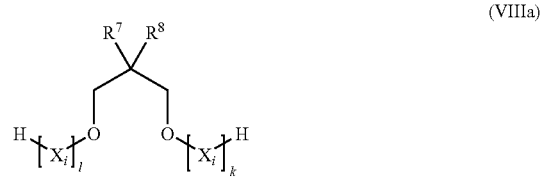

(VIIIa)

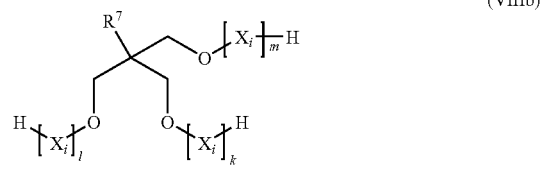

(VIIIb)

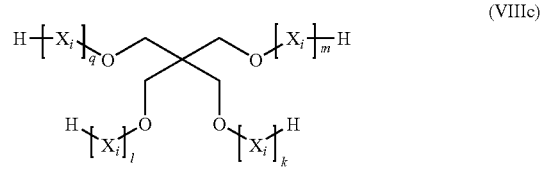

(VIIIc)

in which
$R^7$ and $R^8$ independently of one another are hydrogen or are $C_1$-$C_{18}$ alkyl which is optionally substituted by aryl, alkyl, aryloxy, alkyloxy, heteroatoms and/or heterocycles,
k, l, m, and q independently of one another are each an integer from 1 to 10, preferably 1 to 5, and more preferably 1 to 3, and each $X_i$ for i=1 to k, 1 to l, 1 to m, and 1 to q can be selected independently of one another from the group —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O—, and —CHPh-$CH_2$—O—, preferably from the group —$CH_2$—$CH_2$—O—, —$CH_2$—$CH(CH_3)$—O—, and —$CH(CH_3)$—$CH_2$—O—, and more preferably —$CH_2$—$CH_2$—O—,
in which Ph is phenyl and Vin is vinyl.

$C_1$-$C_{18}$ alkyl therein, optionally substituted by aryl, alkyl, aryloxy, alkyloxy, heteroatoms and/or heterocycles, is for example methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hetadecyl, octadecyl, 1,1-dimethylpropyl, 1,1-dimethylbutyl, 1,1,3,3-tetramethylbutyl, preferably methyl, ethyl or n-propyl, more preferably methyl or ethyl.

These are preferably (meth)acrylates of singly to vigintuply and more preferably triply to decuply ethoxylated, propoxylated or mixedly ethoxylated and propoxylated, and in particular exclusively ethoxylated, neopentyl glycol, trimethylolpropane, trimethyl olethane or pentaerythritol.

Preferred multifunctional polymerizable compounds are ethylene glycol diacrylate, 1,2-propanediol diacrylate, 1,3-propanediol diacrylate, 1,4-butanediol diacrylate, 1,6-hexanediol diacrylate, trimethylolpropane triacrylate, pentaerythritol tetraacrylate, polyester polyol acrylates, polyetherol acrylates, and triacrylate of singly to vigintuply alkoxylated, more preferably ethoxylated, trimethylolpropane.

Very particularly preferred multifunctional polymerizable compounds are 1,4-butanediol diacrylate, 1,6-hexanediol diacrylate, trimethylolpropane triacrylate, pentaerythritol tetraacrylate, and triacrylate of singly to vigintuply ethoxylated trimethylolpropane.

Polyester polyols are known for example from Ullmanns Encyklopädie der technischen Chemie, 4th edition, volume 19, pp. 62 to 65. Preference is given to using polyester polyols obtained by reacting dihydric alcohols with dibasic carboxylic acids. In lieu of the free polycarboxylic acids it is also possible to use the corresponding polycarboxylic anhydrides or corresponding polycarboxylic esters of lower alcohols or mixtures thereof to prepare the polyester polyols. The polycarboxylic acids may be aliphatic, cycloaliphatic, araliphatic, aromatic or heterocyclic and may optionally be substituted, by halogen atoms for example, and/or unsaturated. Examples thereof that may be mentioned include the following:
oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, suberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, their isomers and hydrogenation products, and also esterifiable derivatives, such as anhydrides or dialkyl esters, $C_1$-$C_4$-alkyl esters for example, preferably methyl, ethyl or n-butyl esters, of said acids are used. Preference is given to dicarboxylic acids of the general formula HOOC—$(CH_2)_y$—COOH, y being a number from 1 to 20, preferably an even number from 2 to 20; more preferably succinic acid, adipic acid, sebacic acid, and dodecanedicarboxylic acid.

Suitable polyhydric alcohols for preparing the polyesterols include
1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, polyTHF having a molar mass between 162 and 2000, poly-1,3-propanediol having a molar mass between 134 and 1178, poly-1,2-propanediol having a molar mass between 134 and 898, polyethylene glycol having a molar mass between 106 and 458, neopentyl glycol, neopentyl glycol hydroxypivalate, 2-ethyl-1,3-propanediol, 2-methyl-1,3-propanediol, 2,2-bis (4-hydroxycyclohexyl)propane, 1,1-, 1,2-, 1,3-, and 1,4-cyclohexanedimethanol, 1,2-, 1,3- or 1,4-cyclohexanediol, trimethylolbutane, trimethylolpropane, trimethylolethane, neopentyl glycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt, which may optionally have been alkoxylated as described above.

Preferred alcohols are those of the general formula HO—$(CH_2)_x$—OH, x being a number from 1 to 20, preferably an even number from 2 to 20. Preference is given to ethylene glycol, butane-1,4-diol, hexane-1,6-diol, octane-1,8-diol, and dodecane-1,12-diol. Preference is further given to neopentyl glycol.

Also suitable, furthermore, are polycarbonatediols, such as may be obtained, for example, by reacting phosgene with an excess of the low molecular weight alcohols specified as constituent components for the polyester polyols.

Also suitable are lactone-based polyesterdiols, which are homopolymers or copolymers of lactones, preferably hydroxyl-terminated adducts of lactones with suitable difunctional starter molecules. Suitable lactones include, preferably, those deriving from compounds of the general formula HO—$(CH_2)_z$—COOH, z being a number from 1 to 20 and it being possible for an H atom of a methylene unit to have been substituted by a $C_1$ to $C_4$ alkyl radical. Examples are ε-caprolactone, β-propiolactone, gamma-butyrolactone and/or methyl-ε-caprolactone, 4-hydroxybenzoic acid, 6-hydroxy-2-naphthoic acid or pivalolactone, and mixtures thereof. Examples of suitable starter components are the low molecular weight dihydric alcohols specified above as a constituent component for the polyester polyols. The corresponding polymers of ε-caprolactone are particularly preferred. Lower polyesterdiols or polyetherdiols as well can be used as starters for preparing the lactone polymers. In lieu of the polymers of lactones it is also possible to use the corresponding, chemically equivalent polycondensates of the hydroxycarboxylic acids corresponding to the lactones. The multifunctional polymerizable compound, as recited above, may also comprise urethane(meth)acrylates, epoxy(meth)acrylates or carbonate(meth)acrylates.

Urethane(meth)acrylates are obtainable for example by reacting polyisocyanates with hydroxyalkyl(meth)acrylates or hydroxyalkyl vinyl ethers and, if appropriate, chain extenders such as diols, polyols, diamines, polyamines, dithiols or polythiols. Urethane(meth)acrylates which can be dispersed in water without addition of emulsifiers additionally comprise ionic and/or nonionic hydrophilic groups, which are introduced into the urethane by means of constituent components such as hydroxycarboxylic acids, for example.

Urethane(meth)acrylates of this kind comprise as constituent components substantially:
(a) at least one organic aliphatic, aromatic or cycloaliphatic di- or polyisocyanate,
(b) at least one compound having at least one isocyanate-reactive group and at least one free-radically polymerizable unsaturated group, and
(c) if appropriate, at least one compound having at least two isocyanate-reactive groups.

Possible useful components (a), (b), and (c) may be the same as those described above for the polyurethanes of the invention.

The urethane(meth)acrylates preferably have a number-average molar weight $M_n$ of 500 to 20 000, in particular of 500 to 10 000 and more preferably 600 to 3000 g/mol (determined by gel permeation chromatography using tetrahydrofuran and polystyrene as standard).

The urethane(meth)acrylates preferably have a (meth) acrylic group content of 1 to 5, more preferably of 2 to 4, mol per 1000 g of urethane(meth)acrylate.

Epoxy(meth)acrylates are obtainable by reacting epoxides with (meth)acrylic acid. Examples of suitable epoxides include epoxidized olefins, aromatic glycidyl ethers or aliphatic glycidyl ethers, preferably those of aromatic or aliphatic glycidyl ethers.

Examples of possible epoxidized olefins include ethylene oxide, propylene oxide, isobutylene oxide, 1-butene oxide, 2-butene oxide, vinyloxirane, styrene oxide or epichlorohydrin, preference being given to ethylene oxide, propylene oxide, isobutylene oxide, vinyloxirane, styrene oxide or epichlorohydrin, particular preference to ethylene oxide, propylene oxide or epichlorohydrin, and very particular preference to ethylene oxide and epichlorohydrin.

Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g., 2,5-bis[(2,3-epoxypropoxy)phenyl]octahydro-4,7-methano-5H-indene (CAS No. [13446-85-0]), tris[4-(2,3-epoxypropoxy)phenyl]methane isomers (CAS No. [66072-39-7]), phenol-based epoxy novolaks (CAS No. [9003-35-4]), and cresol-based epoxy novolaks (CAS No. [37382-79-9]).

Examples of aliphatic glycidyl ethers include 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl]ethane (CAS No. [27043-37-4]), diglycidyl ether of polypropylene glycol (α,ω-bis(2,3-epoxypropoxy)poly(oxypropylene), CAS No. [16096-30-3]) and of hydrogenated bisphenol A (2,2-bis[4-(2,3-epoxypropoxy)cyclohexyl]propane, CAS No. [13410-58-7]).

The epoxy(meth)acrylates and epoxy vinyl ethers preferably have a number-average molar weight $M_n$ of 200 to 20 000, more preferably of 200 to 10 000 g/mol, and very preferably of 250 to 3000 g/mol; the amount of (meth)acrylic or vinyl ether groups is preferably 1 to 5, more preferably 2 to 4, per 1000 g of epoxy(meth)acrylate or vinyl ether epoxide (determined by gel permeation chromatography using polystyrene as standard and tetrahydrofuran as eluent).

Carbonate(meth)acrylates comprise on average preferably 1 to 5, especially 2 to 4, more preferably 2 to 3 (meth)acrylic groups, and very preferably 2 (meth)acrylic groups.

The number-average molecular weight $M_n$, of the carbonate(meth)acrylates is preferably less than 3000 g/mol, more preferably less than 1500 g/mol, very preferably less than 800 g/mol (determined by gel permeation chromatography using polystyrene as standard, tetrahydrofuran as solvent).

The carbonate(meth)acrylates are obtainable in a simple manner by transesterifying carbonic esters with polyhydric, preferably dihydric, alcohols (diols, hexanediol for example) and subsequently esterifying the free OH groups with (meth)acrylic acid, or else by transesterification with (meth)acrylic esters, as described for example in EP-A 92 269. They are also obtainable by reacting phosgene, urea derivatives with polyhydric, e.g., dihydric, alcohols.

In an analogous way it is also possible to obtain vinyl ether carbonates, by reacting a hydroxyalkyl vinyl ether with carbonic esters and also, if appropriate, with dihydric alcohols.

Also conceivable are (meth)acrylates or vinyl ethers of polycarbonate polyols, such as the reaction product of one of the aforementioned diols or polyols and a carbonic ester and also a hydroxyl-containing (meth)acrylate or vinyl ether.

Examples of suitable carbonic esters include ethylene carbonate, 1,2- or 1,3-propylene carbonate, dimethyl carbonate, diethyl carbonate or dibutyl carbonate.

Examples of suitable hydroxyl-containing (meth)acrylates are 2-hydroxyethyl(meth)acrylate, 2- or 3-hydroxypropyl(meth)acrylate, 1,4-butanediol mono(meth)acrylate, neopentyl glycol mono(meth)acrylate, glyceryl mono- and di(meth)acrylate, trimethylolpropane mono- and di(meth)acrylate, and pentaerythrityl mono-, di-, and tri(meth)acrylate.

Suitable hydroxyl-containing vinyl ethers are, for example, 2-hydroxyethyl vinyl ether and 4-hydroxybutyl vinyl ether.

Particularly preferred carbonate(meth)acrylates are those of the formula:

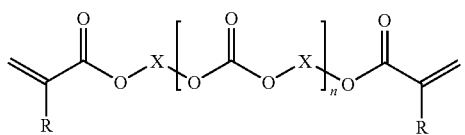

in which R is H or $CH_3$, X is a $C_2$-$C_{18}$ alkylene group, and n is an integer from 1 to 5, preferably 1 to 3.

R is preferably H and X is preferably $C_2$ to $C_{10}$ alkylene, examples being 1,2-ethylene, 1,2-propylene, 1,3-propylene, 1,4-butylene, and 1,6-hexylene, more preferably $C_4$ to $C_8$ alkylene. With very particular preference X is $C_6$ alkylene.

The carbonate(meth)acrylates are preferably aliphatic carbonate(meth)acrylates.

Among the multifunctional polymerizable compounds, urethane(meth)acrylates are particularly preferred.

Photoinitiators may be, for example, photoinitiators known to the skilled worker, examples being those specified in "Advances in Polymer Science", Volume 14, Springer Berlin 1974 or in K. K. Dietliker, Chemistry and Technology of UV and EB Formulation for Coatings, Inks and Paints, Volume 3; Photoinitiators for Free Radical and Cationic Polymerization, P. K. T. Oldring (Eds), SITA Technology Ltd, London.

Suitability is possessed, for example, by mono- or bisacylphosphine oxides, as described for example in EP-A 7 508, EP-A 57 474, DE-A 196 18 720, EP-A 495 751 or EP-A 615 980, examples being 2,4,6-trimethylbenzoyldiphenylphosphine oxide (Lucirin® TPO from BASF AG), ethyl 2,4,6-trimethylbenzoylphenylphosphinate (Lucirin® TPO L from BASF AG), bis(2,4,6-trimethylbenzoyl)phenylphosphine oxide (Irgacure® 819 from Ciba Spezialitätenchemie), benzophenones, hydroxyacetophenones, phenylglyoxylic acid and its derivatives, or mixtures of these photoinitiators. Examples that may be mentioned include benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxyacetophenone, β-methylanthraquinone, tert-butylanthraquinone, anthraquinonecarboxylic esters, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-diisopropylthioxanthone, 2,4-dichlorothioxanthone, benzoin, benzoin isobutyl ether, chloroxanthenone, benzoin tetrahydropyranyl ether, benzoin methyl ether, benzoin ethyl ether, benzoin butyl ether, benzoin isopropyl ether, 7H-benzoin methyl ether, benz[de]anthracene-7-one, 1-naphthaldehyde, 4,4'-bis(dimethylamino)benzophenone, 4-phenylbenzophenone, 4-chlorobenzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[a]anthracene-7,12-dione, 2,2-diethoxyacetophenone, benzil ketals, such as benzil dimethyl ketal, 2-methyl-1-[4-(methylthio)phenyl]-2-morpholinopropan-1-one, anthraquinones such as 2-methylanthraquinone, 2-ethylanthraquinone, 2-tert-butylanthraquinone, 1-chloroanthraquinone, and 2-amylanthraquinone, and 2,3-butanedione.

Also suitable are nonyellowing or low-yellowing photoinitiators of the phenylglyoxalic ester type, as described in DE-A 198 26 712, DE-A 199 13 353 or WO 98/33761.

Preference among these photoinitiators is given to 2,4,6-trimethylbenzoyldiphenylphosphine oxide, ethyl 2,4,6-trimethylbenzoylphenylphosphinate, bis(2,4,6-trimethylbenzoyl)phenylphosphine oxide, benzophenone, 1-benzoylcyclohexan-1-ol, 2-hydroxy-2,2-dimethylacetophenone, and 2,2-dimethoxy-2-phenylacetophenone.

As further typical coatings additives it is possible for example to use antioxidants, stabilizers, activators (accelerants), fillers, pigments, dyes, antistats, flame retardants, thickeners, thixotropic agents, surface-active agents, viscosity modifiers, plasticizers or chelating agents.

It is additionally possible to add one or more thermally activatable initiators, e.g., potassium peroxodisulfate, dibenzoyl peroxide, cyclohexanone peroxide, di-tert-butyl peroxide, azobisisobutyronitrile, cyclohexylsulfonyl acetyl peroxide, diisopropyl percarbonate, tert-butyl peroctoate or benzpinacol, and, for example, those thermally activatable initiators which have a half-life of more than 100 hours at 80° C., such as di-tert-butyl peroxide, cumene hydroperoxide, dicumyl peroxide, tert-butyl perbenzoate, silylated pinacols, which are available commercially, for example, under the trade name ADDID 600 from Wacker, or hydroxyl-containing amine N-oxides, such as 2,2,6,6-tetramethylpiperidine-N-oxyl, 4-hydroxy-2,2,6,6-tetramethylpiperidine-N-oxyl, etc.

Other examples of suitable initiators are described in "Polymer Handbook", 2nd ed., Wiley & Sons, New York.

Suitable thickeners include not only free-radically (co) polymerized (co)polymers but also customary organic and inorganic thickeners such as hydroxymethylcellulose or bentonite.

As chelating agents it is possible, for example, to use ethylenediamineacetic acid and its salts, and also β-diketones.

Suitable fillers comprise silicates, examples being silicates obtainable by hydrolysis of silicon tetrachloride, such as Aerosil® from Degussa, silicious earth, talc, aluminum silicates, magnesium silicates, and calcium carbonates, etc.

Suitable stabilizers comprise typical UV absorbers such as oxanilides, triazines, and benzotriazole (the latter obtainable as Tinuvin® grades from Ciba-Spezialitätenchemie), and benzophenones. They can be employed alone or together with suitable free-radical scavengers, examples being sterically hindered amines such as 2,2,6,6-tetramethylpiperidine, 2,6-di-tert-butylpiperidine or derivatives thereof, e.g., bis(2,2,6, 6-tetramethyl-4-piperidyl) sebacate. Stabilizers are used usually in amounts of 0.1% to 5.0% by weight, based on the solid components comprised in the preparation.

The coating compositions may further comprise a solvent, examples being butyl acetate, ethyl acetate, methoxypropyl acetate, toluene, xylene, fluorinated aromatics, and aliphatic and aromatic hydrocarbon mixtures.

Preferably, however, the coating compositions are applied free from solvent.

If a compound (g) has been incorporated into the polyurethanes of the invention, the polyurethanes of the invention and the coating compositions may also be in dispersion in water.

Coating of the substrates with the coating compositions of the invention takes place in accordance with customary methods which are known to the skilled worker and involve applying a coating composition of the invention, or a coating formulation comprising it, to the target substrate in the desired thickness, and, if appropriate, drying it. This operation may if desired be repeated one or more times. Application to the substrate may take place in a known way, such as for example by spraying, troweling, knifecoating, brushing, rolling, roller coating, pouring, laminating, injection-backmolding or coextruding. Application of the coating material may also take place electrostatically in the form of powder (powder coating materials). The coating thickness is generally in a range from about 3 to 1000 g/m² and preferably 10 to 200 g/m².

Additionally disclosed is a method of coating substrates which involves adding, if appropriate, further, typical coatings additives and thermally curable, chemically curable or radiation-curable resins to a coating composition of the invention or to a coating formulation comprising it, applying the resulting formulation to the substrate, drying it if appropriate, and curing it with electron beams or by UV exposure under an oxygen-containing atmosphere or, preferably, under inert gas, with thermal treatment if appropriate at temperatures up to the level of the drying temperature, and subsequently at temperatures up to 160° C., preferably between 60 and 160° C., more preferably between 100 and 160° C.

Radiation curing takes place with high-energy light, UV light for example, or electron beams. Radiation curing may take place at relatively high temperatures. Preference is given in this case to a temperature above the $T_g$ of the radiation-curable binder.

Radiation curing here means the free-radical polymerization of polymerizable compounds as a result of electromagnetic and/or particulate radiation, preferably UV light in the wavelength range of $\lambda=200$ to 700 nm and/or electron beams in the range from 150 to 300 keV, and more preferably with a radiation dose of at least 80, preferably 80 to 3000 mJ/cm².

Besides radiation curing there may also be further curing mechanisms involved, examples being thermal curing, moisture curing, chemical curing and/or oxidative curing.

The coating materials may be applied one or more times by a very wide variety of spraying methods, such as compressed-air, airless or electrostatic spraying methods, using one- or two-component spraying units, or else by injecting, troweling, knifecoating, brushing, rolling, roller coating, pouring, laminating, injection-backmolding or coextruding.

The coating thickness is generally in a range from about 3 to 1000 g/m² and preferably 10 to 200 g/m².

Drying and curing of the coatings takes place in general under standard temperature conditions, i.e., without the coating being heated. Alternatively the mixtures of the invention can be used to produce coatings which, following application, are dried and cured at an elevated temperature, e.g., at 40-250° C., preferably 40-150° C., and in particular at 40 to 100° C. This is limited by the thermal stability of the substrate.

Additionally disclosed is a method of coating substrates which involves adding, if appropriate, thermally curable resins to the coating composition of the invention or coating formulations comprising it, applying the resulting formulation to the substrate, drying it, and then curing it with electron beams or UV exposure under an oxygen-containing atmosphere or, preferably, under inert gas, if appropriate at temperatures up to the level of the drying temperature.

The method of coating substrates can also be practiced by irradiating the applied coating composition of the invention or coating formulations of the invention first with electron beams or by UV exposure under oxygen or, preferably, under inert gas, in order to obtain preliminary curing, then carrying out thermal treatment at temperatures up to 160° C., preferably between 60 and 160° C., and subsequently completing curing with electron beams or by UV exposure under oxygen or, preferably, under inert gas.

If appropriate, if a plurality of layers of the coating material are applied one on top of another, drying and/or radiation curing may take place after each coating operation. Examples of suitable radiation sources for the radiation cure are low-pressure mercury lamps, medium-pressure mercury lamps with high-pressure lamps, and fluorescent tubes, pulsed lamps, metal halide lamps, electronic flash units, with the result that radiation curing is possible without a photoinitiator, or excimer lamps. The radiation cure is accomplished by exposure to high-energy radiation, i.e., UV radiation, or daylight, preferably light in the wavelength range of $\lambda=200$ to 700 nm, more preferably $\lambda=200$ to 500 nm, and very preferably λ=250 to 400 nm, or by exposure to high-energy electrons (electron beams; 150 to 300 keV). Examples of radiation sources used include high-pressure mercury vapor lamps, lasers, pulsed lamps (flash light), halogen lamps or excimer lamps. The radiation dose normally sufficient for crosslinking in the case of UV curing is in the range from 80 to 3000 mJ/cm$^2$.

It will be appreciated that a number of radiation sources can also be used for the cure: two to four, for example.

These sources may also emit each in different wavelength ranges.

Drying and/or thermal treatment may also take place, in addition to or instead of the thermal treatment, by means of NIR radiation, which here refers to electromagnetic radiation in the wavelength range from 760 nm to 2.5 μm, preferably from 900 to 1500 nm.

Irradiation can if appropriate also be carried out in the absence of oxygen, such as under an inert gas atmosphere. Suitable inert gases are preferably nitrogen, noble gases, carbon dioxide, or combustion gases. Furthermore, irradiation may take place by covering the coating composition with transparent media. Examples of transparent media include polymeric films, glass or liquids, water for example. Particular preference is given to irradiation in the manner described in DE-A1 199 57 900.

As catalysts for the curing of the organosilyl groups it is possible, furthermore, to add acids, masked or otherwise. Preference is given for this purpose to organosulfonic acids, such as methanesulfonic acid, trifluoromethanesulfonic acid, benzenesulfonic acid, p-toluenesulfonic acid or 4-dodecylbenzenesulfonic acid. Further examples are masked sulfonic acids, of the kind supplied, for example, as Nacure® products by King Industries. Acidic catalysts are added in general in amounts up to 2% by weight to the coating composition, preferably up to 1.5% by weight.

The polyurethanes of the invention exhibit high scratch resistance, which is also manifested in a high gloss after mechanical stress. If the requirements imposed on the scratch resistance are not so high, it is possible, alternatively or additionally, to adjust the flexibility to the desired level through selection of component (c).

ppm and percentage figures used in this specification are by weight unless otherwise indicated.

The examples below are intended to illustrate the invention but not to limit it to these examples.

EXAMPLE

The Laromer® 9000 (commercial product of BASF AG, Ludwigshafen) used as a reactant in the given examples is a polyisocyanate containing allophanate groups that is obtained from 1,6-hexamethylene diisocyanate and 2-hydroxyethyl acrylate and has an NCO content of 15.1% by weight (residual monomer content<0.5% by weight) a viscosity of 940 mPas at 23° C., an average molecular weight of about 800 g/mol, and a double-bond density of 2 mol/kg as determined via $^1$H-NMR.

Example 1

In a three-necked flask with reflux condenser and stirrer, 624.78 g of Laromer® LR 9000 (commercial product of BASF AG), 0.50 g of methylhydroquinone and 1.00 g of 2,6-di-tert-butyl-p-cresol are mixed at room temperature. As a catalyst, 0.20 g of dibutyltin dilaurate was added to the thoroughly commixed initial mixture. The resulting mixture was admixed dropwise over the course of 4.5 hours at room temperature with 245.22 g of 3-aminopropyltriethoxysilane. An exothermic reaction was observed, the internal temperature rising to 45° C. At the same time there was an increase in the viscosity of the reaction mixture. Consequently, 300 g of butyl acetate were added. Reaction was continued at an internal temperature of 60° C. until the NCO value of the reaction mixture was 4.09%. Then 128.50 g of 2-hydroxyethyl acrylate were added dropwise over the course of 25 minutes. The reaction mixture was subsequently stirred for two hours at an internal temperature of 75° C. until its NCO value was 0.03%. The solids of the urethane acrylate amounted to 79.7%. The double-bond density of the solvent-free urethane acrylate was 2.41 mol/kg.

Example 2

In a three-necked flask with reflux condenser and stirrer, 400.23 g of Laromer® LR 9000 (commercial product of BASF AG), 41.93 g of 1,6-hexanediol, 0.28 g of methylhydroquinone and 0.56 g of 2,6-di-tert-butyl-p-cresol are mixed with 187.29 g of butyl acetate at room temperature. As a catalyst, 0.11 g of dibutyltin dilaurate was added to the thoroughly commixed initial mixture. A weakly exothermic reaction occurred, so that the internal temperature rose to about 30° C. The reaction mixture was stirred at 75° C. until its NCO value was 4.76%. Then 41.16 g of 2-hydroxyethyl acrylate were added dropwise over the course of 15 minutes. The reaction mixture was subsequently stirred at an internal temperature of 75° C. for 1.5 hours until its NCO value was 2.16%. This reaction mixture was admixed dropwise over the course of 30 minutes at 40° C. with 78.55 g of 3-aminopropyltriethoxysilane. An exothermic reaction was observed, the internal temperature rising to 60° C. After the end of the addition, the reaction mixture was stirred at an internal temperature of 60° C. for 60 minutes until its NCO value was 0.01%. The solids of the urethane acrylate amounted to 76.7%. The double-bond density of the solvent-free urethane acrylate was 2.12 mol/kg.

Example 3

In a three-necked flask with reflux condenser and stirrer, 257.08 g of Laromer® LR 9000 (commercial product of BASF AG), 227.90 g of polyTHF™ 1000 (commercial product of BASF AG, polytetrahydrofuran with average molar mass 1000 g/mol), 0.28 g of methylhydroquinone and 0.56 g of 2,6-di-tert-butyl-p-cresol are mixed with 187.29 g of butyl acetate at room temperature. As a catalyst, 0.11 g of dibutyltin dilaurate was added to the thoroughly commixed initial mixture. A weakly exothermic reaction occurred, so that the internal temperature rose to about 30° C. The reaction mixture was stirred at 75° C. until its NCO value was 2.84%. Then 26.44 g of 2-hydroxyethyl acrylate were added dropwise over the course of 15 minutes. The reaction mixture was subsequently stirred at an internal temperature of 75° C. for 1.5 hours until its NCO value was 1.31%. This reaction mixture was admixed dropwise over the course of 30 minutes at 40° C. with 50.45 g of 3-aminopropyltriethoxysilane. An exothermic reaction was observed, the internal temperature rising to 60° C. After the end of the addition, the reaction mixture was stirred at an internal temperature of 60° C. for 60 minutes until its NCO value was 0.01%. The solids of the urethane acrylate amounted to 75.8%. The double-bond density of the solvent-free urethane acrylate was 1.36 mol/kg.

Example 4

In a three-necked flask with reflux condenser and stirrer, 468.58 g of Laromer® LR 9000 (commercial product of BASF AG), 0.37 g of methylhydroquinone and 0.75 g of 2,6-di-tert-butyl-p-cresol were mixed at room temperature. As a catalyst, 0.15 g of dibutyltin dilaurate was added to the thoroughly commixed initial mixture. Then, simultaneously, 96.38 g of 2-hydroxyethyl acrylate and 183.92 g of 3-aminopropyltriethoxysilane were added dropwise over the course of 60 minutes. An exothermic reaction was observed, so that the internal temperature rose to 60° C. After the exothermic heat had subsided, the reaction mixture was stirred at an internal temperature of 75° C. for a further two hours, until the NCO value of the reaction mixture was 0.02%. At the same time there was an increase in the viscosity of the reaction mixture. Consequently, 300 g of butyl acetate were added. The solids of the urethane acrylate amounted to 86.6%. The double-bond density of the solvent-free urethane acrylate was 2.41 mol/kg.

Example 5

In a three-necked flask with reflux condenser and stirrer, 211.00 g of Laromer® LR 9000 (commercial product of BASF AG), 0.20 g of methylhydroquinone and 0.40 g of 2,6-di-tert-butyl-p-cresol were mixed with 162.00 g of butyl acetate at room temperature. As a catalyst, 0.10 g of dibutyltin dilaurate was added to the thoroughly commixed initial mixture. Then 166.00 g of 3-aminopropyltriethoxysilane were added dropwise over the course of 60 minutes. An exothermic reaction was observed, so that the internal temperature rose to 60° C. After the exothermic heat had subsided, the reaction mixture was stirred at an internal temperature of 75° C. for a further two hours, until the NCO value of the reaction mixture was 0.02%.

Example 6

In a three-necked flask with reflux condenser and stirrer, 200.00 g of Laromer® LR 9000 (commercial product of BASF AG), 71.08 g of PolyTHF™ 1000 (commercial product of BASF AG), 27.20 g of 2-hydroxyethyl acrylate, 0.18 g of methylhydroquinone and 0.36 g of 2,6-di-tert-butyl-p-cresol were mixed at room temperature. As a catalyst, 0.04 g of dibutyltin dilaurate was added to the thoroughly commixed initial mixture. An exothermic reaction was observed, so that the internal temperature rose to 75° C. A further 0.03 g of dibutyltin dilaurate was added and the mixture was stirred at 65° C. for a further 3 hours. Then 5.39 g of glycolic acid and 70 g of acetone were added. After a further 2 hours of reaction at 60° C., the batch was neutralized with 7.17 g of triethylamine, and 50.39 g of 3-aminopropyltriethoxysilane were added dropwise over the course of 10 minutes. Then 2.28 g of methanol were added and stirring was continued at 60° C. for an hour. The batch was dispersed with 700 g of distilled water at 50-60° C. and the organic solvent was distilled off under reduced pressure. The dispersion thus synthesized had a solids content of 40%.

Example 7

In a three-necked flask with reflux condenser and stirrer, 361.29 g of Laromer® LR 9000 (commercial product of BASF AG), 0.40 g of methylhydroquinone and 0.80 g of 2,6-di-tert-butyl-p-cresol were mixed with 67.00 g of butyl acetate at room temperature. As a catalyst, 0.20 g of dibutyltin dilaurate was added to the thoroughly commixed initial mixture. Then 437.52 g of bis(trimethoxysilylpropyl)amine were added dropwise over the course of 150 minutes. An exothermic reaction was observed, so that the internal temperature rose to 46° C. After the exothermic heat had subsided, the reaction mixture was stirred at an internal temperature of 75° C. for a further 15 minutes, until the NCO value of the reaction mixture was 0%.

Application Example 1

Determination of the performance properties of pendulum damping, Erichsen cupping, and scratch resistance.

The pendulum damping was determined in a method based on DIN 53157. High values denote high hardness. For this purpose the radiation-curable compositions were applied to glass in a wet film thickness of 400 μm. The wet films were first flashed off at room temperature for 15 minutes and then dried at 100° C. for 20 minutes. The resulting films were cured at 100° C. in an IST coating unit (type M 40 2×1-R-IR-SLC-So inert) with 2 UV lamps (high-pressure mercury lamps type M 400 U2H and type M 400 U2HC) with a conveyor-belt speed of 10 m/min under a nitrogen atmosphere ($O_2$ content not more than 500 ppm). The radiation dose was approximately 1900 mJ/cm². In embodiment a) curing was carried out only by means of radiation energy, as described above. In embodiment b), exposure took place first with UV light, as described above, followed by curing to completion at 130° C. for 30 minutes.

The Erichsen cupping was determined by a method based on DIN 53156. High values denote high flexibility. For this purpose the respective preparation of the invention was applied using a box-type coating bar to BONDER metal panel 132 in a wet film thickness of 200 μm. Curing was carried out by exposure as described above. Thereafter the Erichsen cupping was determined by pressing a metal ball into the uncoated side of the metal panel.

The scratch resistance was determined by the Scotch-Brite test following storage for 7 days in a controlled-climate chamber. In the Scotch-Brite test, a fiber web modified with silicon carbide and measuring 3×3 cm (Scotch Brite SUFN, from 3M) is affixed as the test element to a cylinder. This cylinder presses the fiber web against the coating at 750 g and is moved over the coating pneumatically. The path length of the deflection amounts to 7 cm. After 10 or 50 double rubs (DR) the gloss is measured in the middle region of the exposure (eight-fold determination) in a method based on DIN 67530 with an incidence angle of 20°. The residual gloss value in percent is given by the ratio of gloss after exposure to initial gloss. After 50 double rubs, the coating is wiped gently twice with a soft cloth soaped with wash benzene, and the residual gloss is measured again. Subsequently the reflow is determined after 2 h at 80° C. in a drying cabinet, by a measurement of the residual gloss.

The radiation-curable composition was produced by intensively mixing 100 parts by weight of the urethane acrylates obtained in examples 1 to 6 with 4 parts by weight of 1-hydroxycyclohexyl phenyl ketone photoinitiator and 0.1 part by weight of Nacure® 2500 (blocked acid catalyst based on p-toluenesulfonic acid, from King Industries).

| Example | Pendulum damping [s] | Erichsen cupping [mm] |
|---|---|---|
| 2a | 134 | 3.7 |
| 2b | 143 | 4.8 |
| 3a | 30 | 7.4 |
| 3b | 36 | 6.5 |
| 4a | 136 | 4.2 |
| 4b | 141 | 3.5 |

-continued

| | | |
|---|---|---|
| 5a | 25 | 5.2 |
| 5b | 123 | 3.4 |
| 6a | 108 | 5.3 |
| 6b | 90 | 4.1 |
| 7a | 17 | 6.9 |
| 7b | 162 | 2.0 |

| Example | Residual gloss [%] after 10 DR | Residual gloss [%] after 50 DR | Residual gloss [%] after wash benzene | Residual gloss [%] after reflow 2 h 80° C. |
|---|---|---|---|---|
| 2a | 69.6 | 47.4 | 58.1 | 82.3 |
| 2b | 68.4 | 45.9 | 53.7 | 82.0 |
| 3a | 68.0 | 57.0 | 56.6 | 59.5 |
| 3b | 96.2 | 78.4 | 85.7 | 85.9 |
| 4a | 62.7 | 41.9 | 50.2 | 62.0 |
| 4b | 77.0 | 56.8 | 66.3 | 79.2 |
| 5a | 69.4 | 46.1 | 58.1 | 82.3 |
| 5b | 84.0 | 64.8 | 75.4 | 83.7 |
| 6a | 97.8 | 93.1 | 85.0 | 92.2 |
| 6b | 96.4 | 93.1 | 87.0 | 91.9 |
| 7a | 90.4 | 69.3 | 75.2 | 77.2 |
| 7b | 93.6 | 82.1 | 86.4 | 89.7 |

The invention claimed is:

1. A polyurethane containing allophanate groups and comprising as synthesis components
   (a) at least one organic aliphatic, aromatic or cycloaliphatic di- or polyisocyanate,
   (b) at least one compound having at least one isocyanate-reactive group and at least one free-radically polymerizable unsaturated group,
   (c) optionally, at least one compound having precisely two isocyanate-reactive groups,
   (d) optionally, at least one compound having at least three isocyanate-reactive groups,
   (e) optionally, at least one compound having precisely one isocyanate-reactive group,
   (f) at least one compound having at least one organosilicon group and precisely one isocyanate-reactive group, and
   (g) optionally, at least one compound having at least one isocyanate-reactive group and at least one dispersive group,
   wherein at least 20 mol % of the compound (b) having at least one isocyanate-reactive group and at least one free-radically polymerizable unsaturated group is incorporated via allophanate groups into said polyurethane.

2. The polyurethane containing allophanate groups according to claim 1, wherein the amount of allophanate groups, calculated as $C_2N_2HO_3=101$ g/mol, is from 1% to 28% by weight.

3. The polyurethane containing allophanate groups according to claim 1, wherein the compound (a) constitutes monomers or oligomers of aliphatic or cycloaliphatic diisocyanates.

4. The polyurethane containing allophanate groups according to claim 1, wherein compound (b) has precisely one isocyanate-reactive group and at least one free-radically polymerizable unsaturated group.

5. The polyurethane containing allophanate groups according to claim 1, wherein compound (b) is selected from the group consisting of 2-hydroxyethyl(meth)acrylate, 2- or 3-hydroxypropyl(meth)acrylate, 1,4-butanediol mono(meth)acrylate, neopentyl glycol mono(meth)acrylate, 1,5-pentandiol mono(meth)acrylate, 1,6-hexanediol mono(meth)acrylate, glycerol mono(meth)acrylate and di(meth)acrylate, trimethylolpropane mono(meth)acrylate and di(meth)acrylate, pentaerythritol mono(meth)acrylate, di(meth)acrylate, and tri(meth)acrylate, and also 4-hydroxybutyl vinyl ether, 2-aminoethyl(meth)acrylate, 2-aminopropyl(meth)acrylate, 3-aminopropyl(meth)acrylate, 4-aminobutyl(meth)acrylate, 6-aminohexyl(meth)acrylate, 2-thioethyl(meth)acrylate, 2-aminoethyl(meth)acrylamide, 2-aminopropyl(meth)acrylamide, 3-aminopropyl(meth)acrylamide, 2-hydroxyethyl(meth)acrylamide, 2-hydroxypropyl(meth)acrylamide, and 3-hydroxypropyl(meth)acrylamide.

6. The polyurethane containing allophanate groups according to claim 1, wherein compound (b) is a mixture of at least two different compounds, (b1) and (b2), compound (b1) being a compound having precisely one isocyanate-reactive group and precisely one free-radically polymerizable unsaturated group and compound (b2) being a compound having precisely one isocyanate-reactive group and at least two free-radically polymerizable unsaturated groups.

7. A water-dispersible polyurethane comprising a polyurethane containing allophanate groups according to claim 1, wherein the organosilicon group is selected from the group consisting of siloxanes having at least one Si—O—C bond or polysiloxanes having at least one Si—O—Si—O—C moiety, it being possible for the silicon atoms to be substituted by any desired, optionally substituted alkyl, aryl or cycloalkyl groups.

8. The water-dispersible polyurethane according to claim 7, wherein the organosilicon compound (f) is of the formula

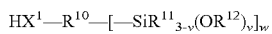

in which
X$^1$ is oxygen (O), sulfur (S), imino (—NH—) or substituted imino (—NR$^5$—),
R$^{10}$ is a (w+1)-valent organic radical,
R$^{11}$ and R$^{12}$ independently of one another are optionally substituted alkyl, cycloalkyl or aryl,
v is a positive integer from 1 to 3, and
w is a positive integer from 1 to 5.

9. The polyurethane containing allophanate groups according to claim 1, wherein compound (f) is selected from the group consisting of N-cyclohexylaminomethylmethyldiethoxysilane, N-cyclohexyl-aminomethyltriethoxysilane, N-phenylaminomethyltrimethoxysilane, N-tri-methoxysilylmethyl-O-methylcarbamate, 1-[3-(trimethoxysilyl)propyl]urea, 3-(diethoxymethylsilyl)propylamine, N-dimethoxy(methyl)silylmethyl-O-methyl-carbamate, N-(2-aminoethyl)-3-aminopropyltrimethoxysilane, N-cyclohexyl-3-aminopropyltrimethoxysilane, 3-aminopropyltrimethoxysilane, 3-aminopropyltriethoxysilane, N-(2-aminoethyl)-3-aminopropyldimethoxysilane, (isocyanatomethyl)methyldimethoxysilane, 3-isocyanatopropyltrimethoxysilane, 3-glycidoloxypropyltrimethoxysilane, 3-glycidoloxypropyltriethoxysilane, 3-(triethoxysilyl)propylsuccinic anhydride, bis[3-(triethoxysilyl)propyl]amine, and bis[3-(trimethoxysilyl)propyl]amine.

10. The polyurethane containing allophanate groups according to claim 1, wherein there is at least one compound (g) present.

11. The polyurethane containing allophanate groups according to claim 10, wherein the compound (g) comprises (g1) anionic groups or groups which can be converted into an anionic group, or nonionic groups (g3).

12. A coating composition comprising
    at least one polyurethane containing allophanate groups according to claim 1,
    optionally, at least one compound having one or more than one free-radically polymerizable double bond,
    optionally, at least one photoinitiator, and
    optionally, additional typical coatings additives.

13. Coated substrates selected from the group consisting of wood, paper, textile, leather, nonwoven, plastics surfaces, glass, ceramic, mineral building materials, cement moldings, fiber cement slabs, and coated and uncoated metals comprising a coating composition according to claim 12.

14. A primer, surfacer, pigmented topcoat material or clearcoat material in the field of industrial coating, wood coating, automotive finishing, OEM finishing or decorative coating comprising a coating composition according to claim 12.

15. A vehicle or aircraft coated with a coating composition according to claim 12.

16. The polyurethane containing allophanate groups according to claim 1, wherein there is at least one compound (c) present.

17. The polyurethane containing allophanate groups according to claim 1, wherein there is at least one compound (d) present.

18. The polyurethane containing allophanate groups according to claim 1, wherein there is at least one compound (e) present.

19. The polyurethane containing allophanate groups according to claim 1, wherein there is:
- at least one compound (c) present,
- at least one compound (d) present,
- at least one compound (e) present, and
- at least one compound (g) present.

20. The polyurethane containing allophanate groups according to claim 1, wherein the molar composition (a):(b):(f):(c):(d):(e):(g) per mole of reactive isocyanate groups in (a) is:
- (b) 1-50 mol % of isocyanate-reactive groups,
- (c) 0-50 mol % of isocyanate-reactive groups,
- (d) 0-10 mol % of isocyanate-reactive groups,
- (e) 0-5 mol % of isocyanate-reactive groups,
- (f) 1-40 mol % of isocyanate-reactive groups,
- (g) 0-25 mol % of isocyanate-reactive groups.

\* \* \* \* \*